US011432318B2

(12) United States Patent
Lu et al.

(10) Patent No.: US 11,432,318 B2
(45) Date of Patent: *Aug. 30, 2022

(54) METHODS AND APPARATUSES FOR TRANSMISSION SCHEDULING IN A WIRELESS COMMUNICATION SYSTEM

(71) Applicant: Telefonaktiebolaget LM Ericsson (publ), Stockholm (SE)

(72) Inventors: Qianxi Lu, Beijing (CN); Zhang Zhang, Beijing (CN); Marco Belleschi, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,274

(22) Filed: Oct. 1, 2020

(65) Prior Publication Data
US 2021/0022170 A1 Jan. 21, 2021

Related U.S. Application Data

(63) Continuation of application No. 15/738,691, filed as application No. PCT/CN2017/108953 on Nov. 1, 2017, now Pat. No. 10,834,747.

(30) Foreign Application Priority Data

Nov. 4, 2016 (WO) ................ PCT/CN2016/104650

(51) Int. Cl.
*H04W 72/12* (2009.01)
*H04W 72/04* (2009.01)
(Continued)

(52) U.S. Cl.
CPC ... *H04W 72/1289* (2013.01); *H04W 72/0413* (2013.01); *H04W 72/121* (2013.01);
(Continued)

(58) Field of Classification Search
CPC ......... H04W 72/1289; H04W 72/0413; H04W 72/121; H04W 72/1242; H04W 72/1247;
(Continued)

(56) References Cited

U.S. PATENT DOCUMENTS

2009/0046653 A1 2/2009 Singh
2012/0129540 A1 5/2012 Hakala
(Continued)

FOREIGN PATENT DOCUMENTS

CN 105934897 A 9/2016
CN 105940742 A 9/2016
(Continued)

OTHER PUBLICATIONS

Examination Report issued by the Government of India for Application No. 201917011508—dated Oct. 28, 2020.
(Continued)

*Primary Examiner* — Warner Wong
(74) *Attorney, Agent, or Firm* — Baker Botts, LLP

(57) ABSTRACT

Embodiments of the present disclosure provide methods, apparatuses and computer programs for scheduling a transmission. A method implemented at a terminal device comprises receiving, from a network device, a scheduling configuration for a device to device, D2D, transmission of the terminal device; receiving, from the network device, an uplink scheduling grant for a cellular uplink transmission in a same time resource overlapping with the D2D transmission; determining a scheduling priority for the D2D transmission relative to the cellular uplink transmission based on at least one of: a first comparison between an associated priority of the scheduling configuration and a first priority threshold, and a transmission restriction; and performing at least one of the D2D transmission and the cellular uplink transmission based on the determined scheduling priority.

(Continued)

With embodiments of the disclosure, D2D transmission and cellular uplink transmission from a terminal device can he well coordinated.

25 Claims, 12 Drawing Sheets

(51) Int. Cl.
*H04W 72/14* (2009.01)
*H04L 67/104* (2022.01)
*H04L 67/61* (2022.01)

(52) U.S. Cl.
CPC ... *H04W 72/1242* (2013.01); *H04W 72/1247* (2013.01); *H04W 72/14* (2013.01); *H04L 67/104* (2013.01); *H04L 67/61* (2022.05)

(58) Field of Classification Search
CPC . H04W 72/14; H04W 72/00; H04W 74/0841; H04L 29/08306; H04L 29/06319; H04L 29/08326; H04L 29/08954; H04L 67/104; H04L 67/322; H04L 65/1066; H04L 65/1069; H04L 1/1854; H04L 1/1887; H04L 41/5022; H04L 24/2433; H04L 47/821; H04L 47/805; H04L 47/24
See application file for complete search history.

(56) References Cited

U.S. PATENT DOCUMENTS

| | | |
|---|---|---|
| 2012/0300712 A1 | 11/2012 | Hakala |
| 2013/0059583 A1 | 3/2013 | Van Phan |
| 2013/0178221 A1 | 7/2013 | Jung |
| 2013/0322413 A1* | 12/2013 | Pelletier ............... H04L 1/1822 370/336 |
| 2015/0043446 A1 | 2/2015 | Tsirtsis et al. |
| 2015/0173048 A1 | 6/2015 | Seo et al. |
| 2016/0278065 A1 | 9/2016 | Kim |
| 2016/0360541 A1 | 12/2016 | Kim |
| 2017/0027015 A1* | 1/2017 | Wijesinghe ........... H04W 40/16 |
| 2017/0079035 A1 | 3/2017 | Seo |
| 2017/0303215 A1 | 10/2017 | Kim |
| 2018/0139724 A1 | 5/2018 | Loehr |
| 2018/0152920 A1 | 5/2018 | Zhao |
| 2018/0249470 A1 | 8/2018 | Seo |
| 2019/0045507 A1* | 2/2019 | Sorrentino .......... H04W 72/042 |

FOREIGN PATENT DOCUMENTS

| | | |
|---|---|---|
| EP | 2 887 560 A | 6/2015 |
| WO | 2015 171066 A1 | 11/2015 |
| WO | 2016 047900 A1 | 3/2016 |

OTHER PUBLICATIONS

Chinese Office Action issued for Application No. 201780066514.9—dated Nov. 3, 2021.
Office Action issued for Korean Patent Application No. 2019-7014612—dated Dec. 28, 2020.
PCT International Search Report for International application No. PCT/CN2017/108953—dated Jan. 22, 2018.
PCT Written Opinion of the International Searching Authority for International application No. PCT/CN2017/108953—dated Jan. 22, 2018.
3GPP TSG RAN WG1 #86bis; Lisbon, Portugal; Source: Samsung; Title: Coexistence of PC5-based V2V operation and legacy Uu operation (R1-1608993)—Oct. 10-14, 2016.
PCT Notification of Transmittal of the International Search Report and the Written Opinion of the International Searching Authority, or the Declaration for International application No. PCT/CN2017/108953—dated Jan. 22, 2018.
Office Action issued for Korean Patent Application No. 2019-7014612—dated Aug. 14, 2020.
3GPP TSG-RAN WG1 #86; Gothenburg, Sweden; Source: Qualcomm Incorporated; Title: Coexistence of PC5 and Uu for V2V {R1-166263)—Aug. 22-26, 2016.
3GPP TSG RAN WG1 Meeting #86bis; Lisbon, Portugal; Source: NTT DOCOMO, Inc.; Title: Discussion on eNB management of prioritizing V2x SL Tx over WAN Tx {R1-1610036)—Oct. 10-14, 2016.
Office Action issued by the Canadian Intellectual Property Office for Application No. 3,042,831—dated Jun. 9, 2020.
Extended European Search Report issued for Application No./Patent No. 17880615.4-1213 / 3556160 PCT/CN2017114981—dated May 29, 2020.
Examination Report No. 1 for Your Standard Patent Application issued by the Australian Government, IP Australia for Application No. 2017352917—dated Dec. 16, 2019.
Extended European Search Report issued for Application No./Patent No. 17867672.2-1215 / 3536098 PCT/CN2017108953—dated Sep. 4, 2019.
3GPP TSG RAN WG1 Meeting #86 bis; Lisbon, Portugal; Source: CATT; Title: On Prioritization of SLTX for V2X under eNB management {R1-1608723)—Oct. 10-14, 2016.
3GPP TSG RAN WG1 Meeting #86; Gothenburg, Sweden; Source: NTT DOCOMO; Title: Details of prioritizing sidelink transmissions over UL transmissions {R1-167360)—Aug. 22-26, 2016.
Examination Report No. 2 for Standard Patent Application issued by the Australian Government, IP Australia for Application No. 2017352917—dated Dec. 1, 2020.
Examination Report No. 1 for Standard Patent Application issued by the Australian Government, IP Australia for Application No. 2020289737—dated Nov. 30, 2021.

* cited by examiner

METHODS AND APPARATUSES FOR TRANSMISSION SCHEDULING IN A WIRELESS COMMUNICATION SYSTEM

PRIORITY

This application is a continuation, under 35 U.S.C. § 120 of U.S. patent application Ser. No. 15/738,691, which is a U.S. National Stage Filing under 35 U.S.C. § 371 of International Patent Application Ser. No. PCT/CN2017/108953 filed Nov. 1, 2017, and entitled "METHODS AND APPARATUSES FOR TRANSMISSION SCHEDULING IN A WIRELESS COMMUNICATION SYSTEM" which claims priority to International Patent Application Ser. No. PCT/CN2016/104650 filed Nov. 4, 2016, all of which are hereby incorporated by reference in their entirety.

TECHNICAL FIELD

The non-limiting and example embodiments of the present disclosure generally relate to the technical field of wireless communications, and specifically to methods, apparatuses and computer programs for transmission scheduling.

BACKGROUND

This section introduces aspects that may facilitate better understanding of the disclosure. Accordingly, the statements of this section are to be read in this light and are not to be understood as admissions about what is in the prior art or what is not in the prior art.

With the evolution of wireless communication, a requirement for supporting device to device (D2D) communication (also referred to as "side-link," "sidelink," or "SL") features which targets at both commercial and Public Safety applications has been proposed. In the Third Generation Partnership Project (3GPP), the D2D communication feature has been introduced during the development of Release 12 (Rel-12) of the Long Term Evolution (LTE) standard. Some applications enabled by Rel-12 LTE include device discovery and proximity-based service (ProSe) mainly optimized for Mission Critical Push To Talk (MCPTT) services, that is, voice traffic for public safety cases.

In 3GPP LTE Release 14 (Rel-14), an extension for the D2D work consists of supporting Vehicle-to-X (V2X) communication, which includes direct communication among vehicles, pedestrians and infrastructure, for example, vehicle to vehicle (V2V), vehicle to pedestrians (V2P) and vehicle to infrastructure (V2I). V2X communications may carry both non-safety and safety information, where each of applications and services may be associated with a specific set of requirements, e.g., in terms of latency, reliability, capacity etc.

V2X communication may take advantage of a network (NW) infrastructure, when available, but at least basic V2X connectivity should be possible even in the case of lacking network coverage. A network-based, for example LTE-based, V2X interface may be economically advantageous because of the LTE economies of scale and capability of tighter integration between communications with LTE NW infrastructure and V2X communications, as compared to using a dedicated V2X technology.

In the network-assisted D2D communication, i.e., D2D communication at least partly configured by the network (for example V2X communication), a terminal device capable of D2D communication may also maintain a connection with a cellular network. For example, the terminal device may also communicate with a base station, for example, for transmitting or receiving data or control via the cellular network. In such a scenario, D2D communication and the cellular communication of the same terminal device may collide and therefore coordination is required.

SUMMARY

Various embodiments of the present disclosure mainly aim at providing methods, apparatuses and computer programs for transmission scheduling in a wireless communication system, particularly a wireless system supporting D2D communications. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a terminal device. The method comprises receiving, from a network device, a scheduling configuration for a device to device, D2D, transmission of the terminal device; receiving, from the network device, an uplink scheduling grant for a cellular uplink transmission in a same time resource overlapping with the D2D transmission; determining a scheduling priority for the D2D transmission relative to the cellular uplink transmission based on at least one of: a first comparison between an associated priority of the scheduling configuration and a first priority threshold, and a transmission restriction; and performing at least one of the D2D transmission and the cellular uplink transmission based on the determined scheduling priority.

In one embodiment, the scheduling configuration may be a semi-persistent scheduling (SPS) configuration, and the associated priority of the scheduling configuration may be a priority specified in the SPS configuration. In another embodiment, the associated priority of the scheduling configuration may be the highest or lowest priority of D2D packet data included in the D2D transmission scheduled by the scheduling configuration.

In another embodiment, the associated priority of the scheduling configuration may be indicated by a logical channel identity or a ProSe Per Packet Priority (PPPP) of a D2D packet in the D2D transmission.

In still another embodiment, the associated priority of the scheduling configuration may indicate priority of a data logical channel included in the D2D transmission of a D2D Media Access Control (MAC) Protocol Data Unit (PDU).

In some embodiments, the transmission restriction may require that the highest or lowest priority of D2D packet data included in the D2D transmission is higher than or equal to the first priority threshold, and in some of these embodiments, the terminal device may transmit a set of D2D packet data via the D2D transmission in the same time resource based on the scheduling configuration, wherein at least one packet of the set of D2D packet data has a priority equal to or higher than the first priority threshold.

In some embodiments, the transmission restriction may require that the value of the highest or lowest priority of D2D packet data included in the D2D transmission is lower than or equal to the value of the first priority threshold.

In another embodiment, the transmission restriction may require that the highest priority of D2D packet data included in the D2D transmission is lower than the first priority threshold, and in this embodiment, the terminal device may perform the cellular uplink transmission in the same time resource based on the uplink scheduling grant. In an embodiment, the transmission restriction may require that the value of the highest priority of D2D packet data included in the D2D transmission is higher than the value of the first priority threshold.

In still another embodiment, determining a scheduling priority for the D2D transmission relative to a cellular uplink transmission may include: determining a first scheduling priority for a first set of D2D packet data with a priority equal to or higher than the first priority threshold, a second scheduling priority lower than the first scheduling priority for the uplink cellular transmission, and a third scheduling priority lower than the second priority for a second set of D2D packet data with a priority lower than the first priority threshold; and in this embodiment, the method may comprise performing at least one of the D2D transmission and the cellular uplink transmission based on the determined scheduling priority by: allocating at least one resources and transmission power for the first set of D2D packet data, the uplink cellular transmission, and the second set of D2D packet data, in a descending scheduling priority order until at least one of available resource and transmission power budget of the terminal device is exhausted; and performing transmission according to the allocated at least one of resources and transmission power.

In some embodiments, the method may further comprise receiving the first priority threshold from the network device.

In an embodiment, the scheduling priority may be determined further based on a second comparison between a priority of the cellular uplink transmission and a second priority threshold. In another embodiment, the method may further comprise receiving the second priority threshold from the network device.

In still another embodiment, the method may further comprise receiving, from the network device, a set of priority values for cellular uplink packets to be prioritized over the D2D transmission; and the scheduling priority may be determined further based on the set of priority values.

In some embodiments, the method may further comprise requesting, from the network device, a resource for transmitting via cellular uplink one of: D2D packet data with a priority lower than the first priority threshold, and D2D packet data with a priority higher than the first priority threshold.

In some embodiments, the method may further comprise reporting, to the network device, a collision between a cellular uplink transmission and a D2D transmission by the terminal device. In one embodiment, the reporting may include reporting the collision between the cellular uplink transmission and the D2D transmission by the terminal device in response to a predefined triggering condition being satisfied. In another embodiment, the predefined triggering condition may include at least one of: receiving a report request from the network device, the number of consecutive collisions exceeding a threshold, the number of collisions in a predefined time duration exceeding a threshold, the number of consecutive collisions exceeding a threshold, and the number of collisions related to a specified logical channel in a predefined time duration exceeding a threshold.

In an embodiment, the reporting may indicate at least one of: a time resource where a collision already occurred, and a time resource where a collision is expected to occur.

In a second aspect of the disclosure, there is provided a method implemented at a network device. The method comprises indicating, to a terminal device, a scheduling configuration for a device to device, D2D, transmission of the terminal device; determining a scheduling priority for the D2D transmission based on at least one of: a first comparison between an associated priority of the scheduling configuration and a first priority threshold, and a transmission restriction; and determining, based on the scheduling priority, whether to schedule a cellular uplink transmission for the terminal device in a same time resource overlapping with the D2D transmission.

In an embodiment, the transmission restriction may require that the highest or lowest priority of D2D packet data included in the D2D transmission is higher than or equal to the first priority threshold, or, require that the highest priority of D2D packet data included in the D2D transmission is lower than the first priority threshold.

In another embodiment, the transmission restriction may require that the value of the highest or lowest priority of D2D packet data included in the D2D transmission is lower than or equal to the value of the first priority threshold, or, require that the value of the highest priority of D2D packet data included in the D2D transmission is higher than the value of the first priority threshold.

In some embodiments, the method may further comprise signaling the first priority threshold to the terminal device.

In still another embodiment, the scheduling configuration may be a semi-persistent scheduling, SPS, configuration, and the associated priority of the scheduling configuration may be a priority specified in the SPS configuration.

In an embodiment, the associated priority of the scheduling configuration may be the highest or lowest priority of D2D packet data to be included in the D2D transmission scheduled by the scheduling configuration.

In another embodiment, the associated priority of the scheduling configuration may be indicated by a logical channel identity or a PPPP of a D2D packet in the D2D transmission.

In still another embodiment, the associated priority of the scheduling configuration may indicate priority of a data logical channel included in the D2D transmission of a D2D MAC PDU.

In some embodiments, the method may further comprise signaling, to the terminal device, a second priority threshold for comparing with a priority of the cellular uplink transmission. In another embodiment, the method may comprise indicating, to the terminal device, a set of priority values for uplink packets to be prioritized over the D2D transmission.

In a further embodiment, the method may further comprise receiving, from the terminal device, a report of collision between a cellular uplink transmission and a D2D transmission by the terminal device. In still another embodiment, the method may further comprise triggering the terminal device to send the report of the collision.

In some embodiments, the report may indicate at least one of a time resource where a collision already occurred, and a time resource where a collision is expected to occur.

In a third aspect of the disclosure, there is provided an apparatus that may be implemented in or as at least part of a terminal device. The apparatus comprises a first receiving unit, configured to receive, from a network device, a scheduling configuration for a device to device, D2D, transmission of the terminal device; a second receiving unit, configured to receive, from the network device, an uplink scheduling grant for a cellular uplink transmission in a same time resource overlapping with the D2D transmission; a determining unit, configured to determine a scheduling priority for the D2D transmission relative to the cellular uplink transmission based on at least one of: a first comparison between an associated priority of the scheduling configuration and a first priority threshold, and a transmission restriction; and a transmitting unit, configured to perform at least one of the D2D transmission and the cellular uplink transmission based on the determined scheduling priority.

In a fourth aspect of the disclosure, there is provided an apparatus that may be implemented in or as at least part of a network device. The apparatus comprises a fist indicating unit, configured to indicate, to a terminal device, a scheduling configuration for a device to device, D2D, transmission of the terminal device; a determining unit, configured to determine a scheduling priority for the D2D transmission based on at least one of: a first comparison between an associated priority of the scheduling configuration and a first priority threshold, and a transmission restriction; and a scheduling unit, configured to determine, based on the scheduling priority, whether to schedule a cellular uplink transmission for the terminal device in a same time resource overlapping with the D2D transmission.

In a fifth aspect of the disclosure, there is provided an apparatus that may be implemented at or as at least part of a terminal device. The apparatus may comprise a processor and a memory. The memory may contain instructions executable by the processor whereby the apparatus is operative to perform the method according to the first aspect of the present disclosure.

In a sixth aspect of the present disclosure, there is provided an apparatus that may be implemented at or as at least part of a network device. The apparatus may comprise a processor and a memory. The memory may contain instructions executable by the processor whereby the apparatus is operative to perform the method according to the second aspect of the present disclosure.

In a seventh aspect of the present disclosure, there is provided an apparatus that may be implemented at or as at least part of a terminal device. The apparatus may comprise processing means adapted to perform the method in accordance with the first aspect of the disclosure.

In an eighth aspect of the disclosure, there is provided an apparatus that may be implemented at or as at least part of a network device. The apparatus may comprise processing means adapted to perform the method in accordance with the second aspect of the disclosure.

In a ninth aspect of the disclosure, there is provided a computer program. The computer program comprises instructions which, when executed on at least one processor, cause the at least one processor to carry out the method according to the first aspect of the disclosure.

In a tenth aspect of the disclosure, there is provided another computer program. The computer program comprises instructions which, when executed on at least one processor, cause the at least one processor to carry out the method according to the second aspect of the disclosure.

In an eleventh aspect of the disclosure, there is provided a communication system including a host computer. The communication system comprises a communication interface configured to receive user data originating from a transmission from a user equipment (UE) to a base station, wherein the UE comprises a radio interface and processing circuitry, and the UE's processing circuitry is configured to carry out the method according to the first aspect of the disclosure.

In a twelfth aspect of the present disclosure, there is provided a method implemented in a communication system including a host computer, a base station and a UE. The method comprises: at the host computer, receiving user data transmitted to the base station from the UE, wherein the UE is configured to carry out the method according to the first aspect of the disclosure.

In a thirteenth aspect of the present disclosure, there is provided a communication system including a host computer. The communication system comprises a communication interface configured to receive user data originating from a transmission from a UE to a base station, wherein the base station comprises a radio interface and processing circuitry, and the base station's processing circuitry is configured to carry out the method according to the second aspect of the disclosure.

In a fourteenth aspect of the present disclosure, there is provided a method implemented in a communication system including a host computer, a base station and a UE. The method comprises: at the host computer, receiving, from the base station, user data originating from a transmission which the base station has received from the UE, wherein the base station is configured to carry out the method according to the second aspect of the disclosure.

According to the various aspects and embodiments as mentioned above, D2D communication and cellular uplink transmission of a terminal device may be well coordinated.

BRIEF DESCRIPTION OF THE DRAWINGS

The above and other aspects, features, and benefits of various embodiments of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
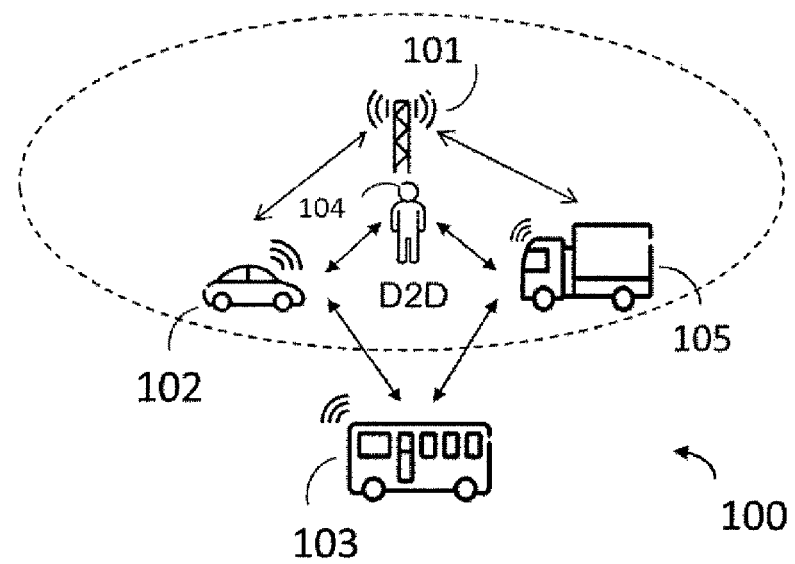
FIG. 1 illustrates a schematic D2D communication scenario based on an LTE network, in which embodiments of the present disclosure may be implemented.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the phrase "wireless communication system" or "wireless communication network" refers to a network following any suitable wireless communication standards, such as LTE-Advanced (LTE-A), LTE, Wideband Code Division Multiple Access (WCDMA), High-Speed Packet Access (HSPA), and so on. Furthermore, the communications between network devices or between a network device and a terminal device in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

As used herein, the phrase "network device" refers to a device in a wireless communication network via which a terminal device accesses the network and receives services therefrom. The network device may refer to a base station (BS), a node B (NodeB or NB), an evolved NodeB (eNodeB or eNB), a Remote Radio Unit (RRU), a radio head (RH), a remote radio head (RRH), a TRP (Transmission Reception Point), AN (access Node), a relay node (RN), or a low power node (LPN) such as a femto, a pico, an access point (AP) and so forth, depending on the applied terminology and technology.

The phrase "terminal device" refers to any end device having wireless communication capabilities. By way of example and not limitation, a terminal device may be referred to as user equipment (UE), which may be a Subscriber Station (SS), a Portable Subscriber Station, a Mobile Station (MS), or an Access Terminal (AT). The terminal device may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the phrases "terminal device", "terminal", "user equipment" and "UE" may be used interchangeably.

For illustrative purposes, several embodiments of the present disclosure will be described in the context of a 3GPP LTE (e.g., Release 14) system. Those skilled in the art will appreciate, however, that the concept and principle of embodiments of the present disclosure may be more generally applicable to other wireless networks, for example 3G CDMA-based network or a 5G or New Radio (NR) system.

FIG. 1 illustrates schematically a wireless communication system in which embodiments of the present disclosure may be implemented. As shown in FIG. 1, the wireless communication system 100 may include one or more network devices, for example network device 101, which may be in a form of an eNB. It would be appreciated that the network device 101 could also be in a form of a Node B, BTS (Base Transceiver Station), and/or BSS (Base Station Subsystem), AP and the like. The network device 101 may provide radio connectivity to a set of terminal devices, for example terminal devices 102 to 105, within coverage of its cell. A terminal device (e.g., terminal device 102) may access the wireless communication system via the network device 101, or communicate with another terminal device (e.g., terminal device 104 or 103) directly via D2D (also referred to as sidelink, SL or Prose).

Sidelink transmissions over a so-called PC5 interface have been standardized in 3GPP since LTE Rel-12. In 3GPP Rel-12, two different D2D operation modes have been specified. In a first mode (also referred to as "mode-1"), a UE in a RRC_CONNECTED mode can request D2D resource from the network, and an eNB may grant a D2D resource to the UE via a physical layer signaling in a format of physical downlink control channel (PDCCH) downlink control indicator format 5 (DCI5) or via a dedicated higher layer signalling. In a second mode (also referred to as "mode-2"), a UE can autonomously select a D2D resource for transmission from a pool of available resources that is provided by the eNB via a broadcasted system information block (SIB) signalling or via a dedicated signaling. Unlike the first operation mode (mode-1), the second operation mode (mode-2) can be implemented also by UEs in a RRC_IDLE state.

In LTE Rel-12, physical layer design for the sidelink has been based on assumptions of few amount of UEs competing for physical resources, voice packet for MCPTT traffic, and low-mobility of the terminal device. However, when usage of the sidelink is extended to the V2X domain In Rel.14, these assumptions do not hold any more. In a V2X scenario, the sidelink should be able to cope with higher load (e.g., potentially, there can be hundreds of cars contending for physical resources), carry time/event triggered V2X messages (e.g., Cooperative Awareness Message (CAM), Decentralized Environmental Notification Message, (DENM)), and support UEs with high mobility. For such reasons, potential enhancements to the physical layer of the sidelink have been discussed in 3GPP. In particular, two new D2D operation modes have been introduced in Rel-14, which include a third mode (also referred to as "mode-3") and a fourth mode (also referred to as "mode-4"). The mode-3 supports semi-persistent scheduling (SPS) of the sidelink besides a dynamic sidelink grant (i.e., in the same manner as that of mode-1), and the mode-4 supports an autonomous resource selection with some enhancements. The enhancements include a so-called sensing procedure in which the UE is required to sense/detect availability of the channel for at least a certain time-frame before selecting a proper resource.

For V2X service, traffic (e.g., CAM messages) can be assumed to arrive periodically. The periodicity of traffic arrival may range from a minimum of 100 ms up to 1 s. The actual traffic arrival periodicity may depend on vehicle speed, acceleration, vehicle heading, and distance covered by vehicle. Such traffic may be scheduled via SPS introduced in D2D operation mode-3.

In addition, packet size of V2X service may vary in time depending on priority of the data to be transmitted and whether security certificate is included or not. Considering this, 3GPP defines periodical traffic model for V2x performance evaluation in TR 36.885, a table from which is reproduced below.

TABLE A. 1.5-1

Message generation period for Periodic traffic

| Index | Vehicle dropping scenarios | Absolute vehicle speed (km/h) | Message generation period (ms) |
|---|---|---|---|
| 1 | Freeway | 140 | 100 |
| 2 | Freeway | 70 | 100 |
| 3 | Urban | 60 | 100 |
| 4 | Urban | 15 | 100 |
| 5 | Urban | 15 | 500 |

From the table, it can be seen that the periodicity is fixed to be 100 or 500 ms. Additionally, a working assumption for the message size is that one 300-byte message is followed by four 190-byte messages.

In order to address the varying periodicity/size of V2X traffic, RAN2 of 3GPP has agreed to introduce a possibility to configure multiple SPS for a same UE, while in a legacy wireless communication system only a single SPS configuration (i.e. single periodicity, single physical resource block (PRB), and, modulation and coding scheme (MCS) configuration) can be supported. By introducing multiple SPS configurations (i.e. multiple periodicity/PRB/MCS configurations) it will be possible to adapt to different V2X messages with different periodicity and packet size. Each of the multiple SPS configurations may have an associated priority (e.g., a PPPP) which may be assigned by the eNB based on, e.g., traffic type of a packet to be scheduled via the SPS configuration.

Besides D2D communication, a terminal device (e.g., UE 102 shown in FIG. 1) in a wireless communication system (e.g., the system 100 shown in FIG. 1) may also be involved in cellular communication with an eNB (e.g., the eNB 101 shown in FIG. 1). For example, the eNB 101 may schedule an uplink transmission from the UE 102. Then in some cases, it is possible that the UE 102 may be scheduled to transmit an uplink packet via cellular communication, and at the same time required to transmit D2D packet data via D2D communication, for example in a SPS manner. This is considered as a collision hereafter. Due to capability limitation (e.g., the UE might not have two separate transmitting chains for UL and SL transmissions), power limitation and/or resource limitation, a terminal device may not able to transmit a cellular uplink packet and D2D packet data simultaneously, and therefore, coordination between D2D communication and cellular communication may be required. For example, a prioritization mechanism may be required in order to establish a rule for the terminal device to determine whether a cellular uplink transmission via a Uu interface or a sidelink transmission via a PC5 interface should be performed when the collision occurs and simultaneous transmission cannot be supported.

A rule specified in 3GPP Rel-12 requires that the UE should always prioritize UL transmissions when such a collision occurs unless the UE is in IDLE more or in DRX dormant state. In 3GPP Rel-13, sidelink gaps have been introduced, that is, the network may configure a set of subframes (possibly upon information related to the UE) in which the UE is allowed to prioritize SL transmissions over UL transmissions. In 3GPP Rel-14, other possible mechanisms discussed in the context of V2X include a possibility to (pre)configure a priority threshold, so that the UE is allowed to prioritize a SL transmission in case priority (the so-called "PPPP") of a SL packet is above the priority threshold.

A typical problem which arises when designing a solution for prioritization handling between transmissions across different interfaces is that the network may not be aware of a decision made by the UE, and as a result, misalignment between UE operations and network operations may occur and it may result in a waste of data/control resources and/or power.

As an example, a problem in the PPPP threshold based prioritization solution discussed in 3GPP Rel-14 is that the network might not know in advance actual status of the UE buffer and PPPP values of SL packet data to be transmitted by the UE. Therefore, it may be hard for the network side to decide whether to schedule a cellular uplink transmission at the same time as the D2D transmission, since there is a risk of wasting data/control resources if the UE prioritizes its SL transmission over the network scheduled uplink transmission.

In addition, in legacy specification, the UE does not signal whether the power is shared between the transmitting chains for UL and SL. This information might be important since the eNB can expect different impact on UL depending on such capability.

Therefore, it is desired that the network side can control the prioritization rule followed by the UE and/or acquire information on UE power sharing between different transmission chains. It is also desired that resource/power waste due to collision can be reduced.

According to embodiments of the present disclosure, methods, apparatuses and computer program products are provided to enable coordination between cellular communication and D2D communication to reduce resource/power waste. In some embodiments, a common understanding on a prioritization operation to be performed by the UE is achieved between the network side and the UE side, and as a result, the network side is enabled to avoid unnecessary cellular scheduling which may be neglected by the UE. In some other embodiment, and the terminal device may provide enhanced capability signalling to enable properly scheduling of the UE at the eNB side.

Figure 2A:
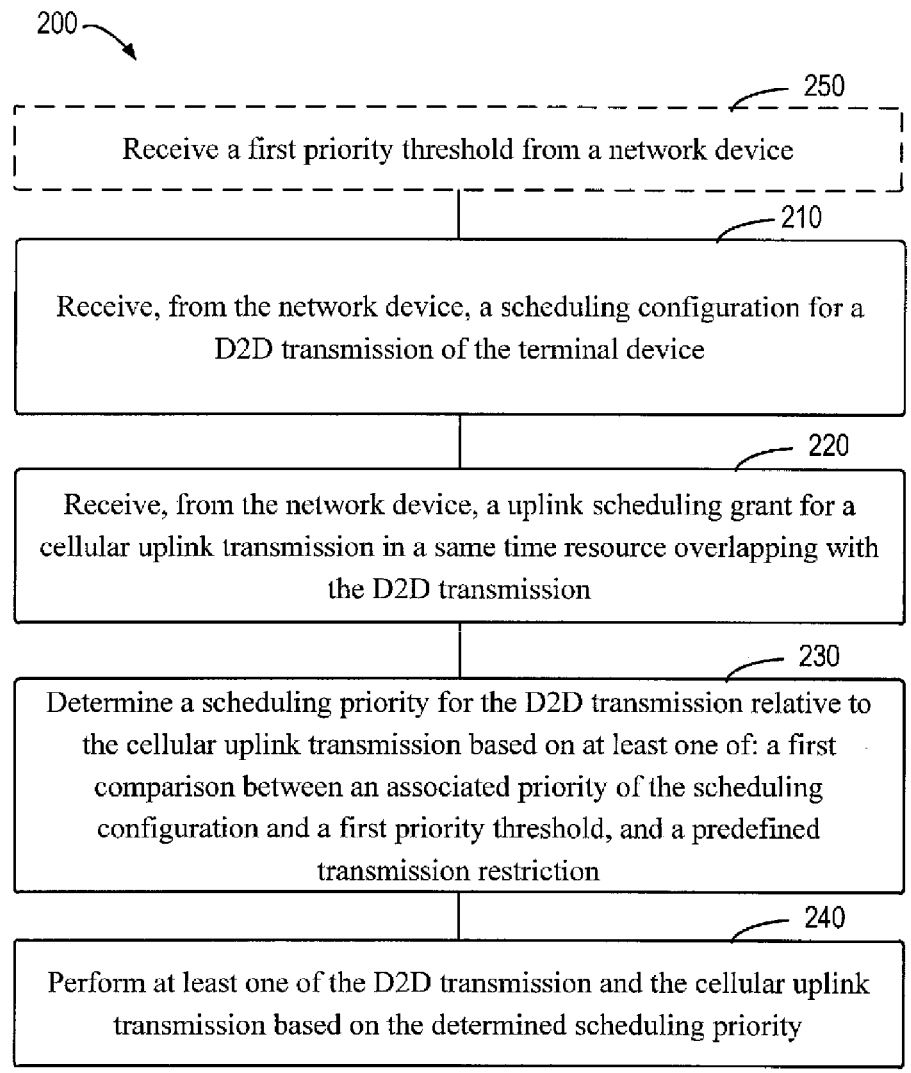
FIGS. 2A-2E illustrate flowcharts of a method implemented at a terminal device according to an embodiment of the present disclosure.

Reference is now made to FIG. 2A, which shows a flowchart of a method 200 according to an embodiment of the present disclosure. The method 200 may be implemented at a terminal device (e.g., any of the terminal devices 102-105 shown in FIG. 1). For simplicity, the method 200 will be described below with reference to the terminal device 102 shown in FIG. 1. However, it is to be understood that the method 200 may also be implemented by any other suitable terminal devices.

As shown in FIG. 2, at block 210, the terminal device 102 receives, from a network device (e.g., the network device 101 shown in FIG. 1), a scheduling configuration for a D2D transmission of the terminal device. In one embodiment, the scheduling configuration may be in a form of physical layer scheduling grant, while in another embodiment, it may be a higher layer (e.g., radio resource control (RRC) layer) signaling. Embodiments of the present disclosure are not limited to any specific form of the scheduling configuration. In addition, the scheduling configuration may be a dynamic configuration, or a semi-persistent configuration. For example, the scheduling configuration may be a semi-persistent scheduling (SPS) configuration specified in LTE of 3GPP. Optionally, in one embodiment, the SPS configuration may specify an associated priority for the scheduled D2D transmission. In some embodiment, the terminal device 101 may receive a plurality of SPS configurations at block 210, and each of the SPS configurations has a specified associated priority.

At block 220, the terminal device 102 receives, from the network device, an uplink scheduling grant for a cellular uplink transmission in a same time resource overlapping with the D2D transmission. The uplink scheduling grant may be, for example but not limited to, an uplink SPS configuration, or a dynamic uplink grant.

The terminal device 102 may or may not be able to perform the scheduled cellular uplink transmission and the D2D transmission simultaneously, due to capability limitation (e.g., lack of two separate transmitting chains for cellular UL and SL transmissions), power limitation and/or resource limitation. At block 230, the terminal device 102 determines a scheduling priority for the D2D transmission relative to the cellular uplink transmission. The determination of the scheduling priority helps the terminal device 102 to determine which transmission(s) should be performed if a collision occurs. At block 240, the terminal device 102 performs at least one of the D2D transmission and the cellular uplink transmission based on the determined scheduling priority.

In one embodiment, the determination of the scheduling priority at block 230 may be based on at least one of: a comparison (referred to as a first comparison) between an associated priority of the scheduling configuration and a first priority threshold, and a transmission restriction.

The associated priority used for the first comparison may be, for example, an associated priority specified in the scheduling configuration signaling (e.g., a SPS configuration signaling). In another embodiment, the associated priority for the first comparison may be the highest or lowest priority of D2D packet data to be included in the D2D transmission scheduled by the scheduling configuration.

In some embodiments, the associated priority of the scheduling configuration may be indicated by a logical channel identity or a PPPP of a D2D packet in the D2D transmission.

Alternatively or in addition, the associated priority of the scheduling configuration may indicate priority of a data logical channel included in the D2D transmission of a D2D MAC PDU.

As an example rather than a limitation, the terminal device 102 may determine that the scheduling priority of the D2D transmission is higher than a cellular uplink transmission if the associated priority is higher than the first priority threshold. In one embodiment, a priority with a lower value is defined as a higher priority. In this embodiment, if the associated priority has a value (e.g., 2) lower than the value (e.g., 5) of the first priority threshold, the associated priority is considered as a priority higher than the first priority threshold. It should be appreciated that in another embodiment, a priority with a higher value may be defined as a higher priority.

In some embodiments, by using the associated priority (e.g., an associated priority specified in a SPS configuration signaling) and the first priority threshold for the first comparison, a same comparison result may be obtained at the network side and the UE side, since information of the associated priority and the first priority threshold may be known to both sides. In this way, a common understanding on the prioritization operation can be achieved by the network device 101 and the UE 102.

In one embodiment, at block 230, the terminal device 102 may determine the scheduling priority of D2D transmission associated with each of a plurality of scheduling configurations respectively. For example, at block 210, the terminal device may receive two SL SPS configurations from the network device 101, one for an associated PPPP with a value A lower than the first priority threshold value, and the other for an associated PPPP with a value B higher than the first threshold value. Here it is assumed that a lower priority value means a higher priority, and at block 230, the terminal device 102 may determine that the D2D transmission corresponding to the SPS configuration with the associated PPPP value A will be prioritized over a cellular uplink transmission, that is, the D2D transmission corresponding to the SPS configuration with the associated PPPP value A has a scheduling priority higher than that of the cellular uplink transmission and will be transmitted when colliding with the cellular uplink transmission. For the D2D transmission corresponding to the SPS configuration with the associated PPPP value B, the terminal device 102 may determine at block 230 that its scheduling priority is lower than that of the cellular uplink transmission.

Alternatively, or in addition, in another embodiment, the terminal device 102 may determine the scheduling priority for the D2D transmission at block 230 based on a transmission restriction. The transmission restriction may define requirement(s)/limitation(s) for a packet allowed to be carried in the D2D transmission. In one embodiment, said transmission restriction may be implemented by higher layer of the terminal device 102, and may require that the highest or lowest priority of D2D packet data to be included in the D2D transmission should be higher than or equal to the first priority threshold. In this embodiment, the terminal device 102 may determine directly at block 230 based on the transmission restriction that the D2D transmission has a scheduling priority higher than that of the cellular uplink transmission. As one example, the transmission restriction may be applied by the terminal device when there is no enough resource/power budget is available.

Alternatively, the terminal device 102 may determine at block 220, the scheduling priority of the D2D transmission based on the highest/lowest priority of packet data to be carried in the D2D transmission. Since according to the transmission restriction, the highest/lowest priority of packet data in the D2D transmission should be equal to or higher than the first priority threshold, the terminal device 101 can determine that the D2D transmission has a scheduling priority equal to or higher than that of a cellular uplink transmission. Accordingly, at block 240, the terminal device may transmit a set of D2D packet data via the D2D transmission in the same time resource based on the scheduling configuration, wherein at least one packet of the set of D2D packet data has a priority equal to or higher than the first priority threshold. In another embodiment, all of the set of D2D packet data included in the D2D transmission at block 240 have a priority equal to or higher than the first priority threshold. Such a transmission restriction also enables the network side to know priority of the D2D transmission, and then prevent scheduling a low priority cellular uplink transmission colliding with the D2D transmission to avoid unnecessary resource/power waste.

As another example, the transmission restriction may require that the highest priority of D2D packet data included in the D2D transmission is lower than the first priority threshold. In this embodiment, at block 240, the terminal device 102 may perform the cellular uplink transmission in the same time resource based on the uplink scheduling grant.

In still another embodiment, the network device 101 may determine the scheduling priority based on both the transmission restriction and the associated priority. For example, the transmission restriction may prevent including D2D packet data with a priority lower than the associated priority of the SPS configuration, and in this embodiment, the terminal device 101 may determine that all the packet data in the D2D transmission have a priority equal to or higher than the associated priority, then it may compare the associated priority with the first priority threshold to determine the scheduling priority of the D2D communication.

In one embodiment, the first priority threshold may be predefined and thus known to both the network device 101 and the terminal device 102. In another embodiment, the first priority threshold may be received by the terminal device 102 from the network device, for example at block 250. Embodiments of the present disclosure are not limited to receiving the first priority threshold in any specific signaling/message.

In some embodiments, at block 240, the terminal device may perform only one of the D2D transmission and the cellular uplink transmission based on the determined scheduling priority. In some other embodiments, the terminal device may have a capability of simultaneously transmitting both D2D and cellular uplink packets. For example, the D2D communication and the cellular uplink transmission may use different frequency bands and the terminal device 102 may have enough transmitting chains to transmit both in the cellular UL and SL in a same transmission time interval (TTI). In some embodiments, though the terminal device has enough transmitting chains, it may be power and/or resource limited, i.e., it may not have enough power and/or resource to transmit all packet data in both cellular UL and D2D. An example embodiment of a method 201 in such a scenario is illustrated in FIG. 2B.

Figure 2B:
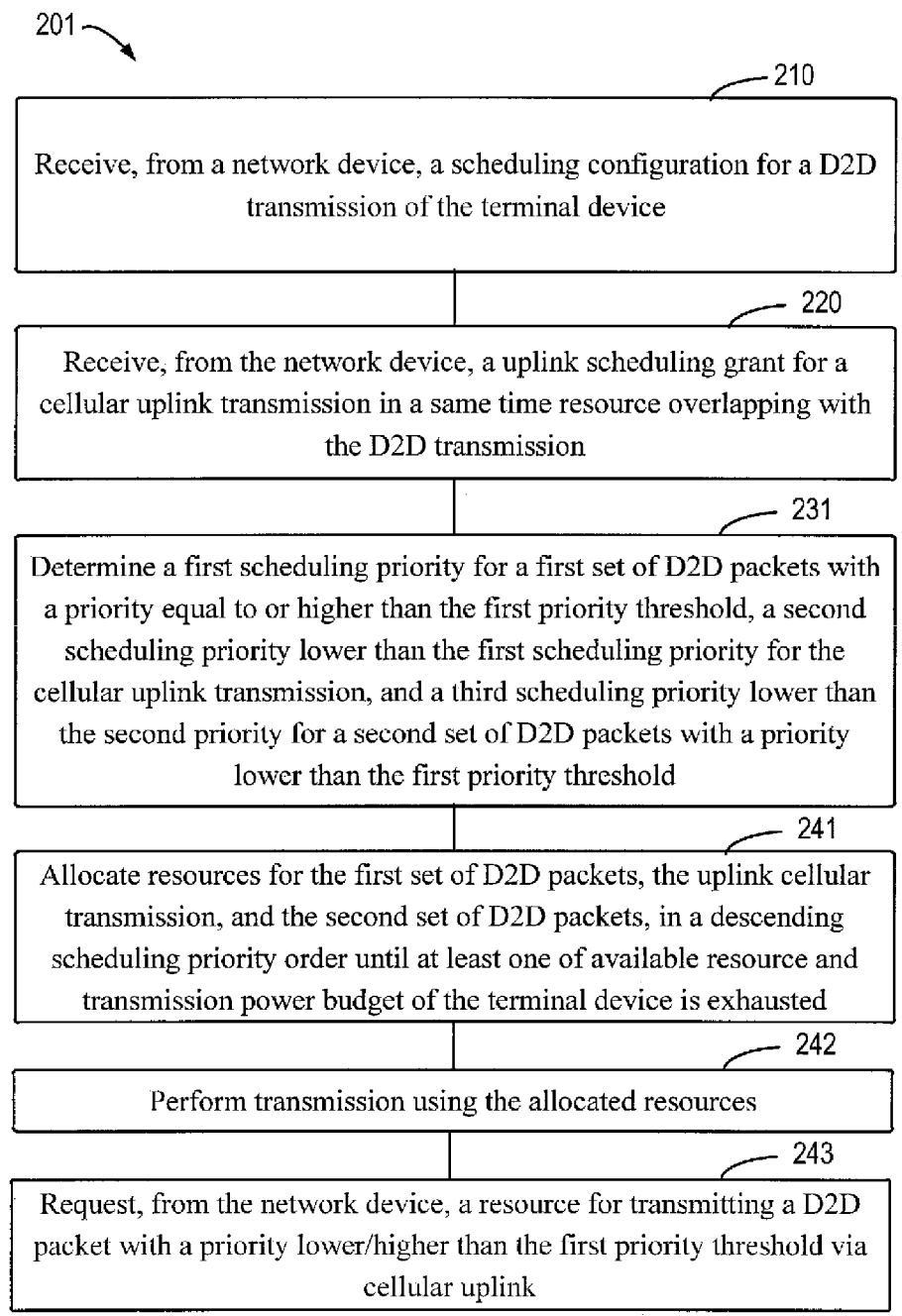

As shown in FIG. 2B, operations in blocks 210 and 220 of FIG. 2B may be the same as those in FIG. 2A, and therefore, descriptions provided with reference to FIG. 2A also apply herein. At block 231, the terminal device 102 may determine a first scheduling priority for a first set of D2D packet data with a priority equal to or higher than the first priority threshold, a second scheduling priority lower than the first scheduling priority for the cellular uplink transmission, and a third scheduling priority lower than the second priority for a second set of D2D packet data with a priority lower than the first priority threshold. At block 241, the terminal device may allocate resources and/or power for the first set of D2D packet data, the uplink cellular transmission, and the second set of D2D packet data, in a descending scheduling priority order until at least one of available resource and transmission power budget of the terminal device is exhausted; and perform transmission according to the allocated resources and/or power at block 242.

In another embodiment, the above prioritization procedure may not be valid for some specific UL channels. For example, the UE may always prioritize a random access channel (RACH), or transmission of some special RRC messages, e.g. message 3, message 5. That is, in some embodiments, the terminal device may determine the scheduling priority further based on, for example, type and/or content of signals and/or data to be transmitted, and/or channel to be used for the transmission.

In another embodiment the above procedure to prioritize SL transmissions may be applied only to physical sidelink shared channel (PSSCH) and physical sidelink control channel PSCCH (i.e. the SL data and control channel), but not to sidelink synchronization signals (SLSS). For example, gaps (e.g., subframe(s) by the eNB) may be configured specifically by the eNB to allow the UE to transmit SLSS. Upon indication of gaps (e.g., subframes) where the UE can transmit a certain D2D signal (e.g., the SLSS), the UE intends to perform the transmission accordingly, e.g., to transmit SLSS in the indicated subframes no matter whether the transmission collide with a cellular uplink. That is, in some embodiments, the terminal device may determine a high scheduling priority for a specific signal (e.g., a D2D signal or cellular uplink signal) based on an indication from the network device. Optionally, the determined scheduling priority for the specific signal may be applied in a certain time duration, for example allocated by the network device.

As another example, at block 240 of FIG. 2A or block 242 of FIG. 2B, the terminal device 102 may prioritize the D2D transmission over UL transmission in a certain TTI when all the D2D packet data have a priority higher than the first priority threshold (e.g., have a PPPP value lower than a PPPP threshold). In another embodiment, if the D2D packet data have a PPPP value higher than the PPPP threshold (i.e., have a priority lower the first threshold) but are already buffered in the terminal device 102 in that TTI, the terminal device 101 may select a larger grant (or in other words, grant more resources) to also accommodate those D2D packet data with PPPPs above the PPPP threshold. That is, at block 231, the terminal device 102 may determine the scheduling priority further based on other factors, such as buffer status. In another embodiment, such a larger grant is only selected in case that there are enough available resources and/or power, for example, when the terminal device 102 estimates from the sensing procedure that there are enough resources available to accommodate also D2D packet data with low priorities.

In another embodiment, at block 240 of FIG. 2A or block 242 of FIG. 2B, the terminal device 102 may transmit only D2D packet data with priorities higher (or lower) than or equal to the first priority threshold, according to a corresponding transmission restriction, e.g., when there is too limited resource and/or power to accommodate all D2D packet data. Optionally, the terminal device 102 may further request at block 243, from the network device, a resource for transmitting D2D packet data with a priority lower (or higher) than the first priority threshold via cellular uplink. For example, the first priority threshold may have a PPPP value of 2, and after allocating D2D resource for D2D packet data with PPPP values of 0-2, there may be little D2D resource left for transmitting all the D2D packet data with PPPP values of 3~7 (priority lower than threshold). In one embodiment, in such a case, the higher layer at terminal device 102 may determine to route the D2D packet data with priority corresponding to PPPP values 3~7 to cellular side, that is, to transmit these packet data via cellular uplink instead of a D2D transmission. Then at block 243 the terminal device 102 may request, from the network device 101, a resource for transmitting the D2D packet with a priority lower (or higher) than the first priority threshold via cellular uplink. As a result of the above transmission restriction and a corresponding rule for determining the scheduling priority, the network device 101 (for example, a scheduler thereof) may determine that there are D2D traffic with low PPPP values (i.e., high priorities) carried by the D2D transmission, so it may try to avoid UL scheduling colliding with these D2D transmissions, since the D2D traffic with lower PPPP values would cause clown-prioritization of the cellular UL transmission if collision occurs.

Here the block 231 of FIG. 2B may be considered as an example implementation of the block 230 shown in FIG. 2A, and blocks 241 and 242 of FIG. 2B may be considered as an example implementation of block 240 shown in FIG. 2A.

Though in some of the above embodiments, high priority (for example indicated by a low PPPP value) traffic is transmitted via D2D communication, while low priority (for example indicated by a high PPPP value) traffic is transmitted on cellular UL according to a transmission restriction implemented for example by higher layer of the terminal device, it should be appreciated that a different transmission restriction may be applied in another embodiment. That is, low priority traffic may be transmitted via D2D communication, while high priority traffic is transmitted via cellular UL. It can be achieved, for example, by adopting a different transmission restriction for the D2D communication. In such a case (i.e., cellular UL transmission is prioritized over D2D transmission), the network device 101 may schedule a cellular uplink transmission even if it collides with a D2D transmission, or avoid a D2D scheduling configuration colliding with cellular UL grants, if knowing that the UE may down-prioritize the corresponding D2D transmission.

In some embodiments, the terminal device 101 may assume a common priority for all cellular uplink transmissions when determining the scheduling priority for the D2D transmission at block 230 of FIG. 2A or block 231 of FIG. 2B. For example, if the associated priority of the D2D SPS configuration is higher than the first priority threshold, the terminal device 102 may determine that the D2D transmission associated with the SL SPS configuration has a higher priority than all cellular uplink transmissions.

Figure 2C:
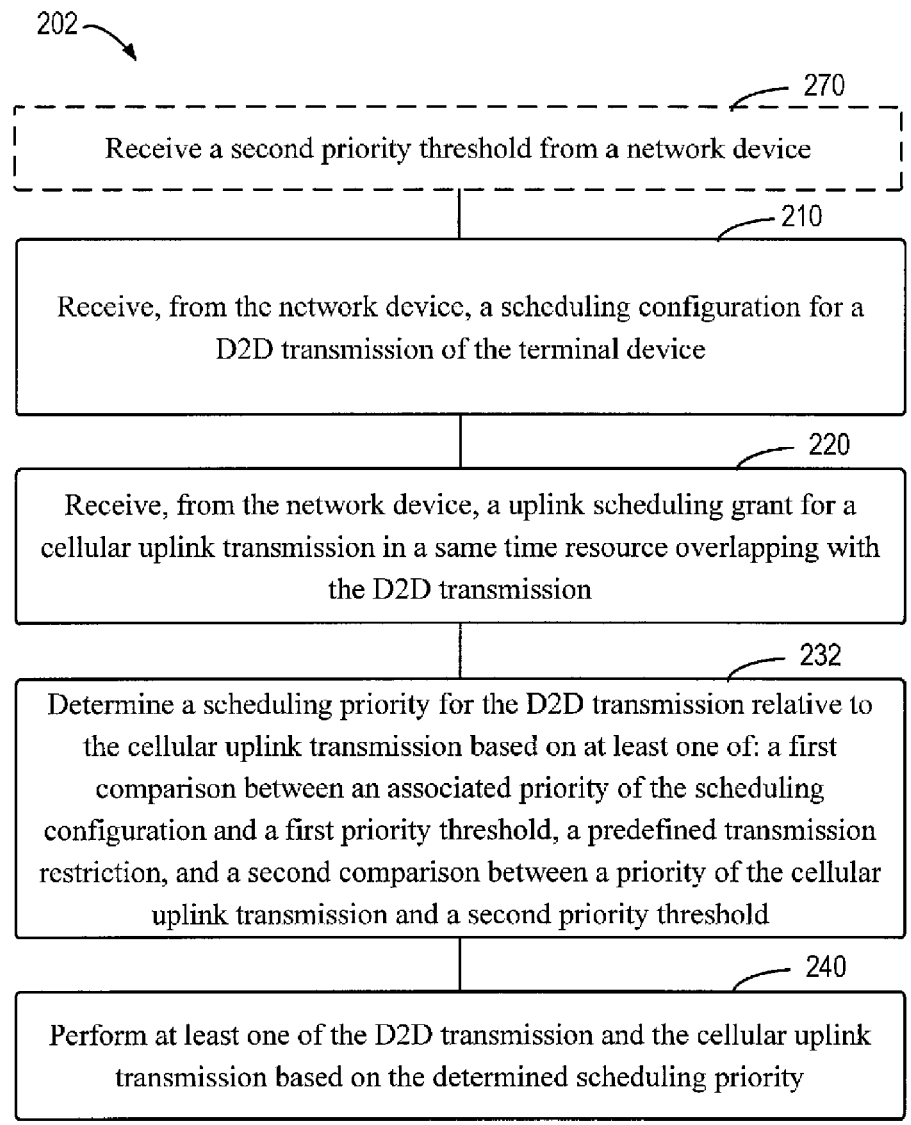

Alternatively, in an embodiment of method 202 shown in FIG. 2C, the terminal device may consider different priorities of different cellular uplink transmissions. As shown in FIG. 2C, at block 232, the scheduling priority may be determined further based on a second comparison between a priority of the cellular uplink transmission and a second priority threshold.

For example, if the scheduling priority of the D2D transmission is higher than the first priority threshold and a priority of the cellular uplink transmission is lower than the second priority threshold, then the terminal device 101 may determine at block 232 that the scheduling priority of the D2D communication is higher than that of the cellular uplink transmission. At block 240, the terminal device may perform the D2D transmission. Just as an example, the priority of the cellular uplink transmission may be determined based on a priority of a logical channel associated with the cellular uplink transmission. In one embodiment, if there are a plurality of logical channels associated with the cellular uplink transmission, the priority of the cellular uplink transmission may be determined based on, for example, the highest/lowest priority of the plurality of logical channels.

As another example, if the scheduling priority of the D2D transmission is lower than the first priority threshold and a priority of the cellular uplink transmission is higher than the second priority threshold, then the terminal device 102 may determine at block 232 that the scheduling priority of the D2D communication is lower than that of the cellular uplink transmission, and then at block 240, the terminal device 102 may perform the cellular uplink transmission.

In another example, if the scheduling priority of the D2D transmission is lower than the first priority threshold and a priority of the cellular uplink transmission is also lower than the second priority threshold, then the terminal device 102 may determine at block 232 that the scheduling priority of the D2D communication is lower than that of the UL packet, and then at block 240, the terminal device 102 may perform the cellular uplink transmission.

As another example, if the scheduling priority of the D2D transmission is higher than the first priority threshold and a priority of the cellular uplink transmission is also higher than the second priority threshold, then the terminal device 102 may determine at block 232 that the scheduling priority of the D2D communication is lower than that of the cellular uplink transmission, and then at block 240, the terminal device 102 may perform the cellular uplink transmission.

It should be appreciated that, the above rules for determination are provided just for illustration, and in some embodiments, a different rule may be defined. For example, if the scheduling priority of the D2D transmission is higher than the first priority threshold and a priority of an UL packet is also higher than the second priority threshold, then the terminal device 102 may determine at block 232 that the scheduling priority of the D2D communication is higher than that of the UL packet.

Similar to the first priority threshold, the second priority threshold may be predefined or received by the terminal device 102 from the network device 101, for example at block 270.

In one embodiment, operations of other blocks 210 and 220 in FIG. 2C may be the same as those described with reference to FIG. 2A.

Figure 2D:
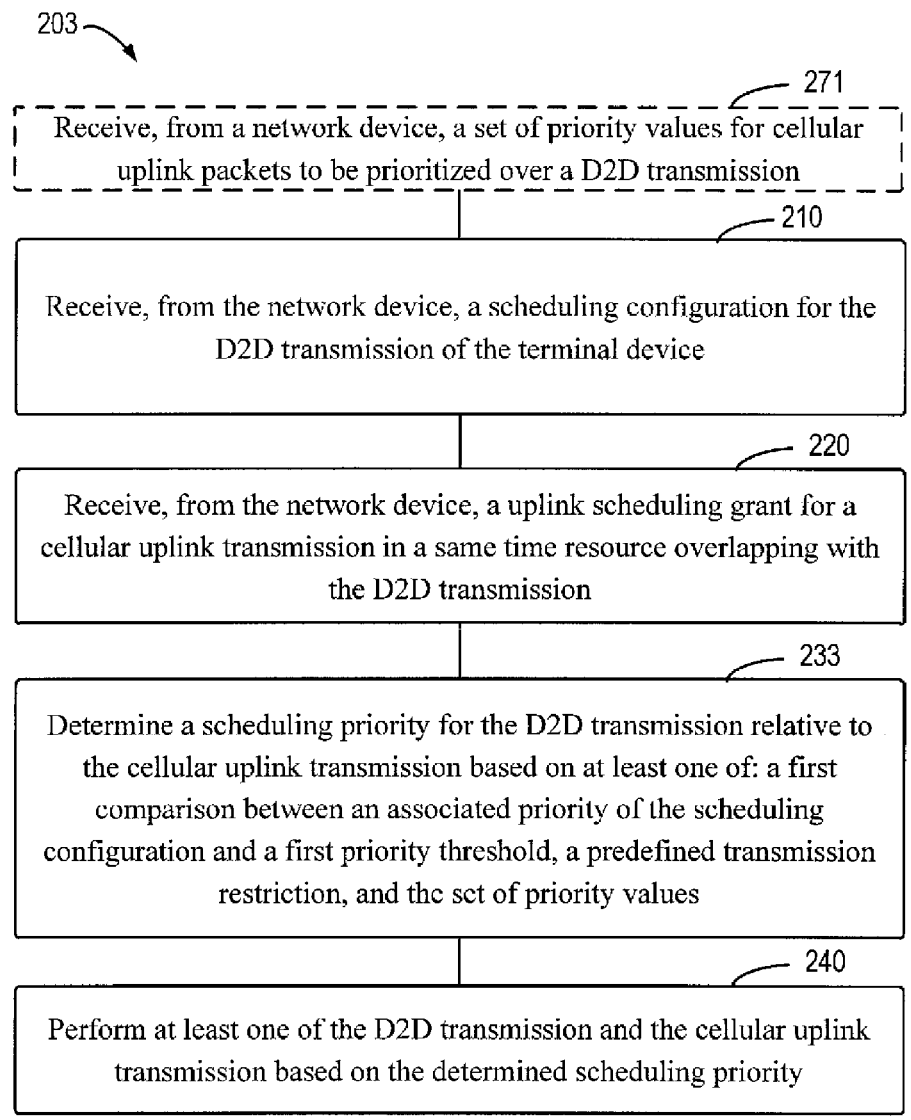

Alternatively, or in addition, in an embodiment of method 203 shown in FIG. 2D, at block 271, the terminal device 102 may receive from the network device, a set of priority values for cellular uplink packets to be prioritized over the D2D transmission. In this way, the network device 101 can guarantee for example, uplink packets with higher priorities can be transmitted by the terminal device 102 even if they collide with a D2D transmission. At block 233, the terminal device 102 may determine the scheduling priority for the D2D transmission further based on the set of priority values. For example, the terminal device 102 may give an absolute high priority to transmission of logical channels with one of the set of priority values, regardless of the first priority threshold and the priority of D2D packet data to be transmitted.

Some of the above prioritization rules may also apply to respective Hybrid Automatic Repeat Request (HARQ)

retransmissions. For example, the terminal device 102 may prioritize cellular uplink retransmission over D2D (re)transmissions if the priority of the cellular uplink retransmission is higher than the second priority threshold and priority of the D2D (re)transmission is lower than the first priority threshold. Alternatively, in another embodiment, the determination of the scheduling priority may consider whether a transmission is a new transmission or a retransmission. For example, retransmissions (either cellular uplink or D2D) are always prioritized over transmissions of new packet data, regardless of the first/second priority threshold.

Figure 2E:
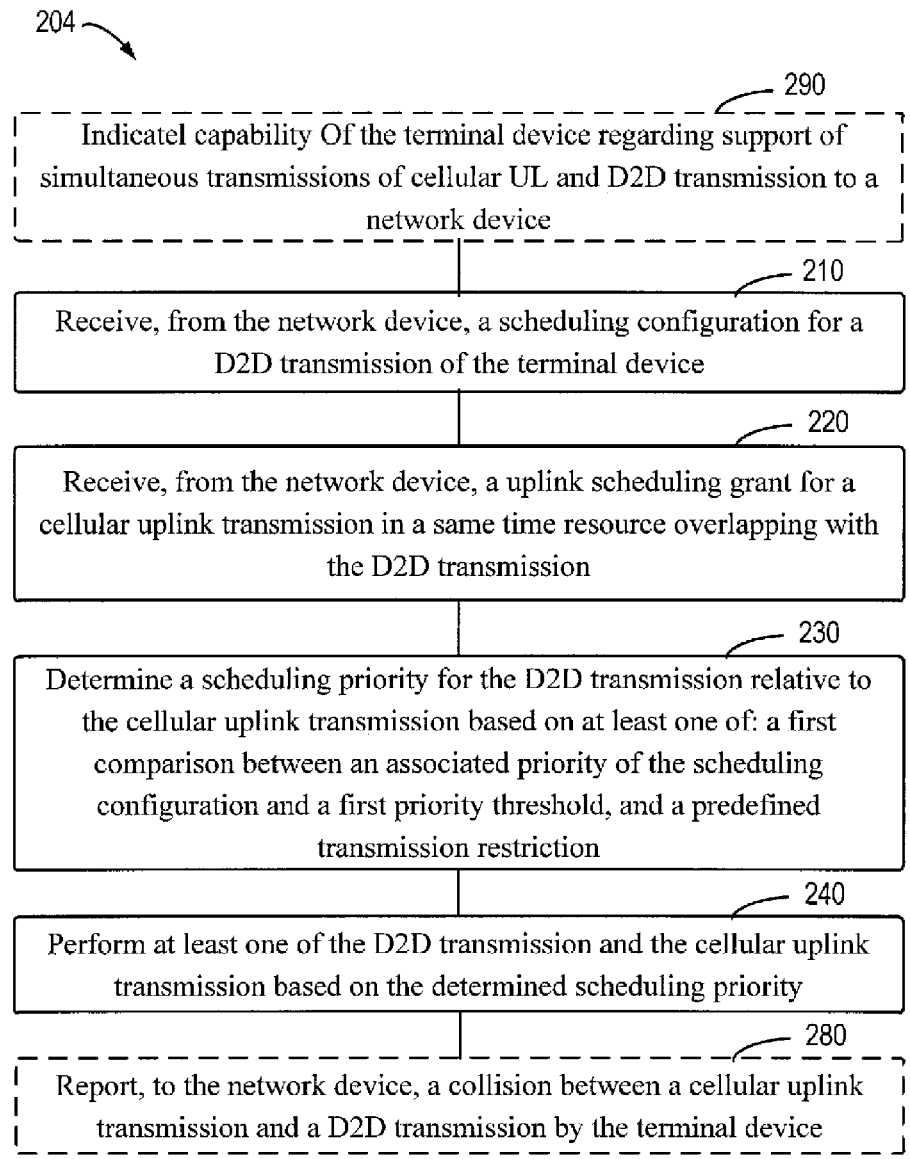

Optionally, in one embodiment of method 204 shown in FIG. 2E, at block 280, the terminal device 102 may report a collision between a cellular uplink transmission and a D2D transmission by the terminal device. The report may enable the network device 101 to be aware of the collision status and then take proper actions, for example.

At block 280, the terminal device 102 may report the collision in response to a predefined triggering condition being satisfied. For example, rather than limitation, the predefined triggering condition may include at least one of:
  receiving a report request from the network device,
  the number of consecutive collisions exceeding a threshold,
  the number of collisions in a predefined time duration exceeding a threshold,
  the number of consecutive collisions exceeding a threshold, and
  the number of collisions related to a specified logical channel in a predefined time duration exceeding a threshold.

That is, the terminal device 102 may report the collision to the network device 101 based on an order/command from the network device 101, or based on an event. For example, in an embodiment, the network device 101 may configure the UE to report collision occurrences, e.g., all of those occasions in which the D2D transmission is prioritized over the cellular UL transmissions. At block 280, the terminal device 102 may report the collision via for example a RRC signaling such as an in-device co-existing signaling or another UE assistance information message.

In another embodiment, the report at block 280 may be triggered e.g., after a certain configurable number of consecutive collisions between cellular UL transmission and D2D transmissions. Alternatively, the report may be triggered after a certain configurable number of consecutive collisions between UL transmissions with a certain logical channel identifier (LCID) and D2D transmissions.

In another embodiment, the report may be triggered if at least a certain number of collisions has occurred during a given time period, e.g., 1 s.

Embodiments are not limited to any specific format of the report. Just as an example, the report may indicate at least one of: a time resource where a collision already occurred, and a time resource where a collision is expected to occur. In one embodiment, the report may contain a bitmap indicating the subframes in which the collisions occurred, or alternatively indicating the subframes in which the D2D packet data were prioritized over a cellular uplink transmission.

As another example, the terminal device 102 may additionally or alternatively indicate a set of subframes in which transmissions of D2D packet data with priorities higher than the configured first priority threshold is expected in the future, e.g. in the next subframes of current system frame number (SFN) period.

The network side may use such report transmitted at block 280 to learn possible patterns of the SL transmissions, e.g. the network device 101 may learn the periodicity of transmissions of D2D packet data with certain PPPP values, so that the network can avoid scheduling the terminal device in the cellular UL in those subframes where D2D transmission of packet data with the PPPP values below the first priority threshold (e.g., a PPPP threshold) is expected.

In some embodiments, at an optional block 290 shown in FIG. 2E, the terminal device 102 may signal its capability regarding support of simultaneous transmissions in UL and SL to the network device 101. In some scenarios the terminal device 102 may be capable of supporting simultaneous transmissions of cellular UL and SL (e.g. the terminal device 102 has separated transmitting chains for UL and SL), and the overall power budget is shared between the UL and SL. Therefore although the UE may support simultaneous UL/SL transmissions, the Uu performances, i.e., uplink cellular transmission performance, may be impacted if the power budget is shared.

In one embodiment, the capability signalling transmitted from the terminal device 102 at block 290 may indicate, for each frequency band combination in which simultaneous cellular UL and SL transmissions are supported, whether the power budget is shared or not. That is to say, the capability may be carrier-specific or frequency band-specific, and the terminal device may indicate the capability for each carrier/band respectively in a single message or multiple messages. Embodiments of the present disclosure are not limited to any specific form for the capability signaling and just for example rather than limitation, the capability signalling may be defined as follows:

```
BandCombinationParameters-r14:: = SEQUENCE {
    v2xSupportBandsPerBC-r14        BIT STRING (SIZE (1.. maxBands)) OPTIONAL,
    v2xPwerBandsPerBC-r14           BIT STRING (SIZE (1.. maxBands)) OPTIONAL,
    ...
}
```

Here, v2xSupportedBandsPerBC-r14 may be a bitmap indicating for the different bands in each band combination whether simultaneous SL and TX is supported (bit set to "1") or not (but set to "0"). In one embodiment, v2xPowerBandsPerBC-r14 may also be a bitmap set as follows:
"0"
  For each band in a given band combination in which simultaneous SL/UL transmission is not supported,
  For each band in a given band combination in which simultaneous SL/UL transmission is supported, and the power budget is shared between SL and UL in that band.
"1"
  For each bands in a given band combination in which simultaneous SL/UL transmission is supported and the power budget is not shared, In another alternative embodiment, the capability signaling may be as follows:

```
SL-V2XParameters-r14 ::- SEQUENCE {
    v2xSimultaneousTx-r14    ENUMERATED {supported}           OPTIONAL,
    powerBands-r14           ENUMERATED {shared, notShared}   OPTIONAL,
}
```

Here, v2xSimultaneousTx may be a legacy field, and it indicates whether the UE supports simultaneous transmissions in UL and SL in all the band in which the UE supports simultaneous reception in UL and SL. The new field powerBands-r14 indicates whether the UE shares the power in all the carriers in which the UE supports simultaneous transmission in UL and SL.

Upon reception of the capability signalling as described above, the network device 101 may decide whether to configure the first and/or second priority threshold (which may be, for example, a PPPP threshold) and to properly schedule the terminal device 102. For example, if the terminal device 102 supports simultaneous transmission of UL and SL, and the power is not shared in a certain carrier, the network device 101 may not need to configure the first and/or the second priority threshold, otherwise the network device 101 may configure a first and/or the second threshold. The network device 101 may also schedule the terminal device 102 in UL in those carriers in which the UE can support simultaneous transmission in UL/SL in order to do not penalize UL.

Figure 3:
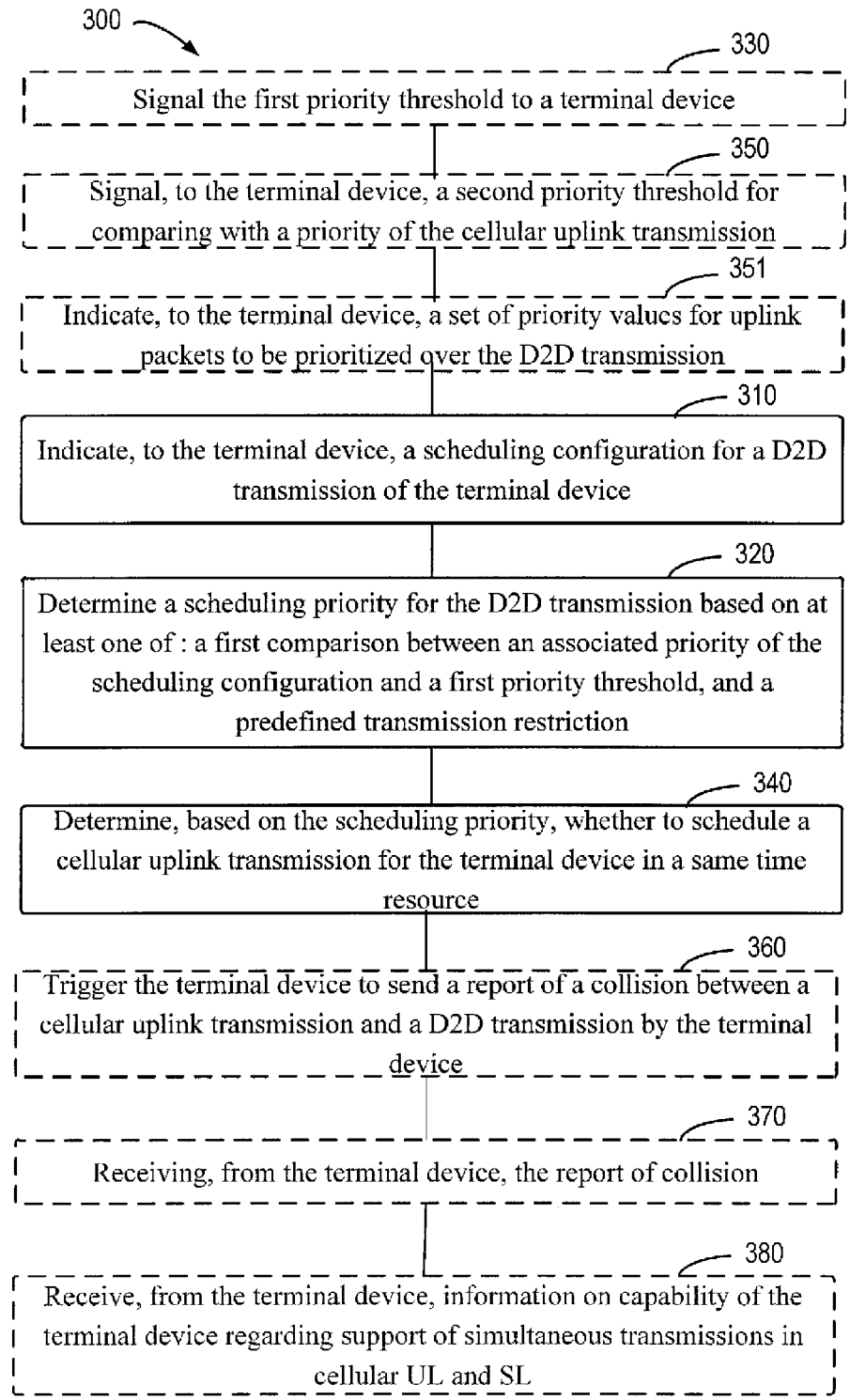
FIG. 3 illustrates a flowchart of a method implemented at a network device according to another embodiment of the present disclosure.

Reference is now made to FIG. 3, which shows a flowchart of a method 300 according to an embodiment of the present disclosure. The method 300 may be implemented at a network device (e.g., the network device 101 shown in FIG. 1). For simplicity, the method 300 will be described below with reference to the network device 101 shown in FIG. 1. However, it is to be understood that the method 300 may also be implemented by any other suitable network devices.

As shown in FIG. 3, at block 310, the network device 101 indicates, to a terminal device (e.g., the UE 102 shown in FIG. 1), a scheduling configuration for a D2D transmission of the terminal device. The scheduling configuration may be for example a dynamic scheduling grant or a SPS configuration. The scheduling grant may specify an associated priority. In one embodiment, the associated priority may be but not limited to, a PPPP specified in 3GPP. In one embodiment, the associated priority may be determined by the network device based on a traffic type of a packet to be carried in the D2D communication.

In another embodiment, at block 310 the network device 101 may transmit a plurality of scheduling configurations (e.g., SPS configurations) to the terminal device 102, and each of the scheduling configurations has an associated priority.

At block 320, the network device 101 determines a scheduling priority for the D2D transmission based on at least one of: a first comparison between an associated priority of the scheduling configuration and a first priority threshold, and a transmission restriction.

In one embodiment, the first priority threshold may be predefined and thus known to both the network device 101 and the terminal device 102. In another embodiment, optionally, the first priority threshold may be signaled by the network device 101 to the terminal device, for example at block 330. Embodiments of the present disclosure are not limited to any specific signaling/message for transmitting the first priority threshold.

In some embodiments, the associated priority of the scheduling configuration may be indicated by a logical channel identity or a PPPP of a D2D packet in the D2D transmission.

Alternatively or in addition, the associated priority of the scheduling configuration may indicate priority of a data logical channel included in the D2D transmission of a D2D MAC PDU.

As an example rather than a limitation, the network device 101 may determine the scheduling priority of the D2D transmission in a similar way as that described with reference to block 230-233 of FIGS. 2A-2E, and therefore details related to determining the scheduling priority, transmission restriction and rules, provided with reference to FIGS. 2A-2E also apply here and will not be repeated.

Based on the determined scheduling priority of the D2D transmission, the network device is aware of whether the D2D transmission or a cellular uplink transmission will be prioritized by the terminal device when a collision occurs, that is, whether the D2D transmission or the cellular uplink transmission will be performed by the terminal device.

As shown in FIG. 3, in one embodiment, at block 340, the network device 101 may determine, based on the scheduling priority, whether to schedule a cellular uplink transmission for the terminal device in a same time resource overlapping with the D2D transmission. For example, at block 340, the network may determine to schedule an uplink transmission even if it collides with a D2D SPS configuration with a priority value B which is higher than the first threshold value, but may determine to avoid an UL scheduling colliding with a SL SPS configuration with a priority value A which is lower than the first threshold value.

As an example, the network device 101 may assume a common priority for all cellular uplink transmissions when determining at block 340 whether to schedule a cellular uplink transmission to the terminal device in a same time resource as that for a D2D transmission. For example, if the associated priority of the D2D SPS configuration is higher than the first priority threshold, the network device 101 may determine that the D2D transmission associated with the SL SPS configuration has a higher priority than all cellular uplink transmissions and determine at block 340 to avoid uplink transmission in a same time resource with the D2D transmission.

In another embodiment, the network device 101 may enable the terminal device 102 to consider different priorities of different cellular uplink transmissions when determining scheduling priority of a D2D transmission. For example, at block 350, the network 101 may optionally signal to the terminal device, a second priority threshold for comparing with a priority of the cellular uplink transmission in order to determine the D2D scheduling priority.

Alternatively, or in addition, in another embodiment, at block 351, the network device 101 may indicate, to the terminal device 102, a set of priority values for uplink packets to be prioritized over the D2D transmission. In this way, the network device 101 can guarantee for example, uplink packets with indicated high priority can be transmitted even if it collides with a D2D transmission.

Optionally, in one embodiment, the network device 101 may trigger/order the terminal device 102 to report a collision between a cellular uplink transmission and a D2D transmission by the terminal device, for example at block 360. At block 370, the network device 101 may receive, from the terminal device 102, the report of collision. The report enables the network device 101 to be aware of the collision status and then take proper actions. It should be appreciated that the block 360 for triggering the report is not mandatory, and in another embodiment, the network device 101 may receive the report from the terminal device at block 370 with or without the triggering operation in advance.

In one embodiment, the report received at block 370 indicates at least one of: a time resource where a collision has already occurred and a time resource where a collision is expected to occur. In still another embodiment, the report may only indicate collisions where a D2D transmission is prioritized (or, is expected to prioritize) over a cellular uplink transmission, that is, a time resource where the cellular uplink transmission is cancelled due to collision with a D2D transmission. In another embodiment, the report may alternatively only indicate collisions where a cellular uplink transmission is prioritized (or, is expected to prioritize) over a D2D transmission.

In some embodiments, at an optional block 380 shown in FIG. 3, the network device 101 may receive from the terminal device 102 information on capability of the terminal device 102 regarding support of simultaneous transmissions in cellular UL and SL. Descriptions provided with reference FIG. 2E on the capability signaling also apply here and details will not be repeated. Upon reception of the capability signaling at block 380, the network device 101 may decide whether to configure the first and/or second priority threshold (which may be, for example, a PPPP threshold) and to properly schedule the terminal device 102. For example, if the terminal device 102 supports simultaneous transmission of UL and SL, and the power is not shared in a certain carrier, the network device 101 may not need to configure the first and/or the second priority threshold, otherwise the network device 101 may configure a first and/or the second threshold. The network device 101 may also schedule the terminal device 102 in UL in those carriers in which the UE can support simultaneous transmission in UL/SL in order to do not penalize UL.

Figure 4:
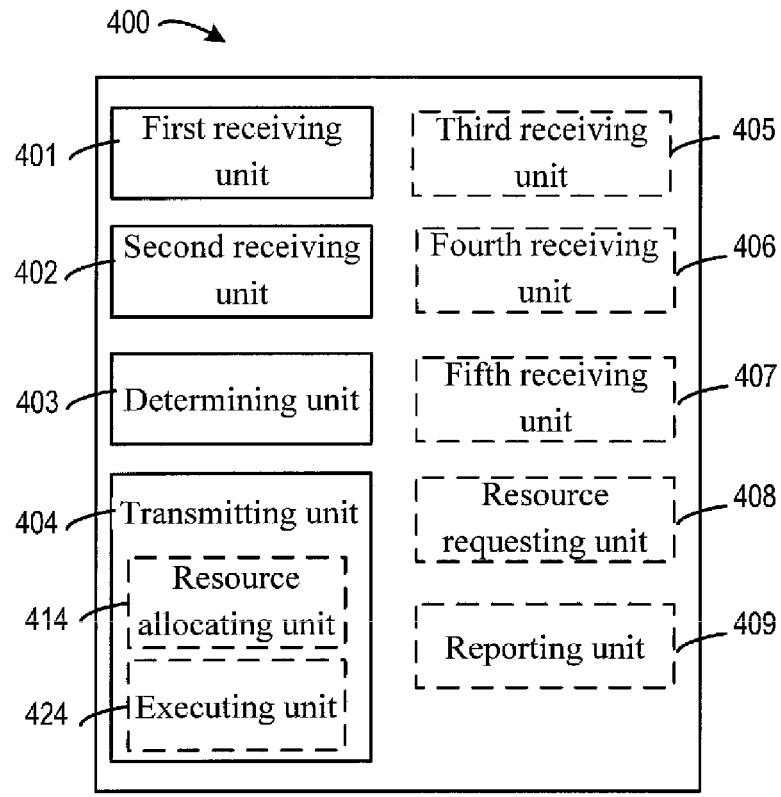
FIG. 4 illustrates a simplified block diagram of an apparatus implemented in/as a terminal device according to an embodiment of the present disclosure.

FIG. 4 illustrates a schematic block diagram of an apparatus 400 implemented in/as at least part of a terminal device, for example, one of the terminal devices 102-105 shown in FIG. 1. The apparatus 400 is operable to carry out one or more of example methods 200-204 described with reference to FIGS. 2A-2E and possibly any other processes or methods. It is also to be understood that any of the methods 200-204 is not necessarily carried out by the apparatus 400. At least some blocks of the methods 200-204 can be performed by one or more other entities.

As illustrated in FIG. 4, the apparatus 400 includes a first receiving unit 401, configured to receive, from a network device, a scheduling configuration for a device to device, D2D, transmission of the terminal device; a second receiving unit 402, configured to receive, from the network device, an uplink scheduling grant for a cellular uplink transmission in a same time resource overlapping with the D2D transmission; a determining unit 403, configured to determine a scheduling priority for the D2D transmission relative to the cellular uplink transmission based on at least one of: a first comparison between an associated priority of the scheduling configuration and a first priority threshold, and a transmission restriction; and a transmitting unit 404, configured to perform at least one of the D2D transmission and the cellular uplink transmission based on the determined scheduling priority.

In one embodiment, the first receiving unit 401 and the second receiving unit 402 may be configured to perform functions/operations described with reference to blocks 210 and 220 in FIGS. 2A-2E respectively. In another embodiment, the determining unit 403 may be configured to perform functions/operations described with reference to any of blocks 230-233 in FIGS. 2A-2E. Likewise, in still another embodiment, the transmitting unit 404 may be configured to perform functions/operations described with reference to any of blocks 240-242 in FIGS. 2A-2E. Therefore, descriptions with respect to the scheduling configuration, transmission restrictions, rules for determining the scheduling priority, and transmitting of D2D and cellular uplink packets provided with reference to FIGS. 2A-2E also apply here and details will not be repeated for simplicity.

Just for illustration, in one embodiment, the determining unit 403 may be configured to determine the scheduling priority by determining a first scheduling priority for a first set of D2D packet data with a priority equal to or higher than the first priority threshold, a second scheduling priority lower than the first scheduling priority for the uplink cellular transmission, and a third scheduling priority lower than the second priority for a second set of D2D packet data with a priority lower than the first priority threshold; and the transmitting unit 404 may further include a resource allocating unit 414, configured to allocate resources and/or power for the first set of D2D packet data, the uplink cellular transmission, and the second set of D2D packet data, in a descending scheduling priority order until at least one of available resource and transmission power budget of the terminal device is exhausted; and an executing unit 424, configured to perform transmission using the allocated resources and/or power.

In another embodiment, the apparatus 400 may further comprise a third receiving unit 405, configured to receive the first priority threshold from the network device. It can be appreciated that in some embodiments where the first priority threshold is predefined, the third receiving unit 405 may be omitted.

Alternatively, or in addition, in an embodiment, the apparatus 400 the determining unit 403 may be configured to determine the scheduling priority further based on a second comparison between a priority of the cellular uplink transmission and a second priority threshold. In another embodiment, the apparatus 400 may further comprise a fourth receiving unit 406 configured to receive the second priority threshold from the network device. It can be appreciated that in some embodiments where the second priority threshold is predefined, the fourth receiving unit 406 may be omitted.

Alternatively, or in addition, the apparatus 400 may further comprise a fifth receiving unit 407 configured to receive, from the network device 101, a set of priority values for cellular uplink packets to be prioritized over the D2D transmission; and the determining unit 403 may be configured to determine the scheduling priority further based on the set of priority values.

In one embodiment, the determining unit 403 may be configured to utilize the first priority threshold, second priority threshold, and/or the set of priority values in a similar way as that described with reference to any of blocks 230-233 in FIGS. 2A-2E. Therefore previous descriptions with respect to the determining of the scheduling priority of methods 200-204 also apply here.

In an embodiment, the apparatus 400 may optionally comprise a resource requesting unit 408 configured to request, from the network device 101, a resource for transmitting D2D packet data with a priority lower than the first priority threshold via cellular uplink. In another embodiment, the resource requesting unit 408 may be configured to request a resource for transmitting D2D packet data with a priority higher (or lower) than or equal to the first priority threshold via the cellular uplink. As an example, the resource requesting unit 408 may send such a request if a corresponding transmission restriction is applied, or, there is no enough resource to accommodate all D2D packet data to be transmitted. This embodiment enables to the terminal device 101 to route some of D2D packet data to the cellular network.

In a further embodiment, the apparatus 400 may optionally comprise a reporting unit 409 configured to report to the network device 101 a collision between a cellular uplink transmission and a D2D transmission. In some embodiments, the reporting unit 409 may be configured to report the collision between the cellular uplink transmission and the D2D transmission by the terminal device in response to a predefined triggering condition being satisfied. For example rather than limitation, the predefined triggering condition may include at least one of: receiving a report request from the network device for example by a sixth receiving unit not shown in FIG. 4, the number of consecutive collisions exceeding a threshold, the number of collisions in a predefined time duration exceeding a threshold, the number of consecutive collisions exceeding a threshold, and the number of collisions related to a specified logical channel in a predefined time duration exceeding a threshold. The report may indicate, for example, a time resource where a collision already occurred, and/or a time resource where a collision is expected to occur in future, e.g., in following subframes of current SFN period.

In some embodiments, the apparatus 400 may optionally comprise a capability reporting unit not shown in FIG. 4, configured for transmitting capability regarding support of simultaneous transmissions in UL and SL to the network device 101.

Figure 5:
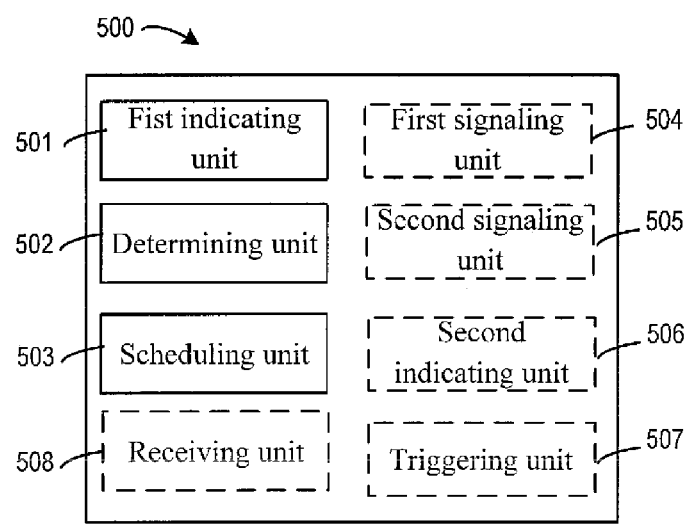
FIG. 5 illustrates a simplified block diagram of an apparatus implemented in/as a network device according to an embodiment of the present disclosure.

FIG. 5 illustrates a schematic block diagram of an apparatus 500 implemented in/as at least part of a network device, for example, the network device 101 shown in FIG. 1. The apparatus 500 is operable to carry out the example method 300 described with reference to FIG. 3 and possibly any other processes or methods. It is also to be understood that the method 300 is not necessarily carried out by the apparatus 500. At least some blocks of the method 300 can be performed by one or more other entities.

As illustrated in FIG. 5, the apparatus 500 includes a first indicating unit 501, a determining unit 502 and a scheduling unit 503. The first indicating unit 501 is configured to indicate, to a terminal device (e.g., terminal device 102 shown in FIG. 1), a scheduling configuration for a D2D transmission of the terminal device. The determining unit 502 is configured to determine a scheduling priority for the D2D transmission based on at least one of: a first comparison between an associated priority of the scheduling configuration and a first priority threshold, and a transmission restriction. The scheduling unit 503 is configured to determine, based on the scheduling priority, whether to schedule a cellular uplink transmission for the terminal device in a same time resource overlapping with the D2D transmission.

In one embodiment, the indicating unit 501, the determining unit 502 and the scheduling unit 503 may be configured to perform functions/operations described with reference to blocks 310-330 in FIG. 3 respectively. In another embodiment, the apparatus 500 may be or embodied in a network device communicating with the apparatus 400 and a terminal device which may implement any of the methods 200-204. Therefore, descriptions with respect to the scheduling configuration, transmission restrictions, rules for determining the scheduling priority, and scheduling provided with reference to FIGS. 2A-2E and FIG. 3 also apply here and details will not be repeated for simplicity.

In an embodiment, the apparatus 500 may further comprise a first signaling unit 504 configured to signal the first priority threshold to the terminal device. In another embodiment, the first signaling unit 504 may be omitted and the first priority threshold may be predefined.

Optionally, in another embodiment, the apparatus 500 may further comprise a second signaling unit 505 configured to signal, to the terminal device, a second priority threshold for comparing with a priority of the cellular uplink transmission. Alternatively, or in addition, the apparatus 500 may comprise a second indicating unit 506 configured to indicate, to the terminal device, a set of priority values for uplink packets to be prioritized over the D2D transmission.

In a further embodiment, the apparatus 500 may optionally comprise a receiving unit 507 configured to receive, from the terminal device, a report of collision between a cellular uplink transmission and a D2D transmission by the terminal device. In another embodiment, the apparatus 500 may comprise a triggering unit 508 configured to trigger the terminal device to send the report of the collision. The triggering unit 508 is optional and may be omitted in another embodiment where the report of the collision may be triggered based on an event automatically at the terminal side.

In some embodiments, the apparatus 500 may comprise a capability acquiring unit not shown in FIG. 5, configured for receiving, from the terminal device 102, information on capability of the terminal device 102 regarding support of simultaneous transmissions in cellular UL and SL.

Figure 6:
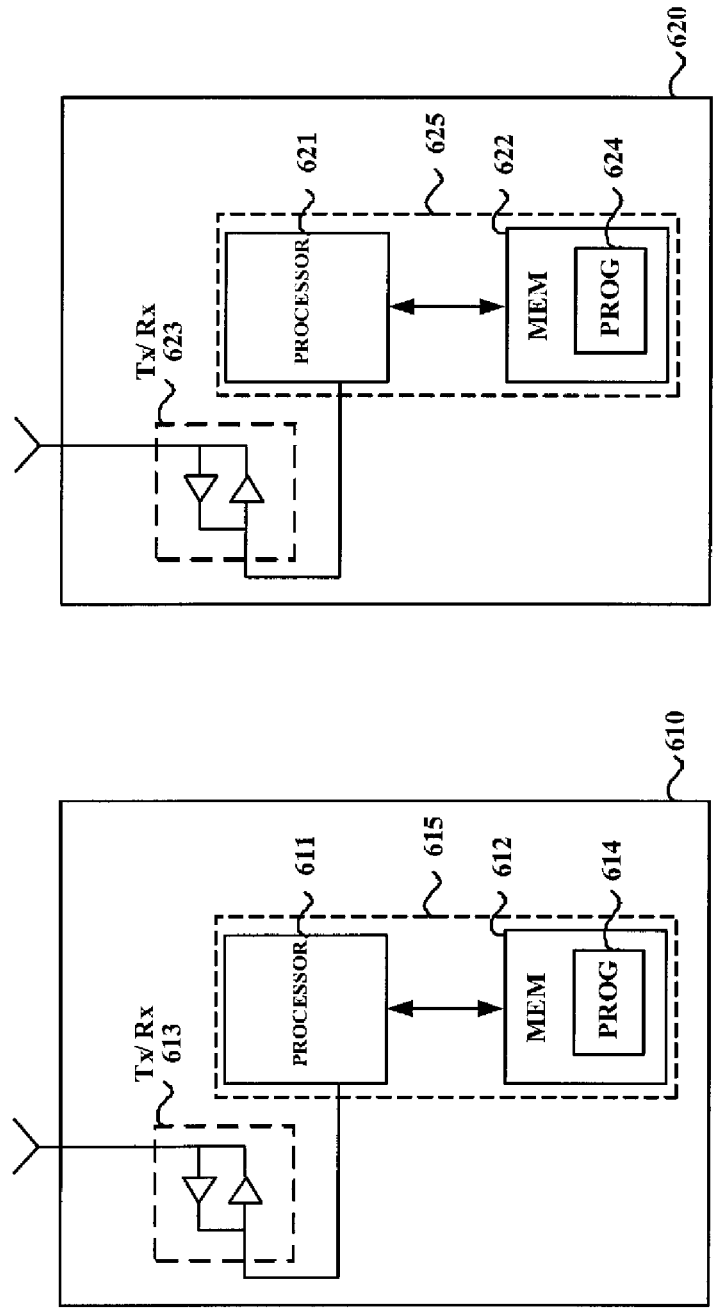
FIG. 6 illustrates simplified block diagrams of an apparatus in a network device and a terminal device, according to an embodiment of the present disclosure.

FIG. 6 illustrates a simplified block diagram of an apparatus 610 that may be embodied in/as at least part of a network device, e.g., the network device 101 shown in FIG. 1, and an apparatus 620 that may be embodied in/as at least part of a terminal device, e.g., one of the terminal devices 102-105 shown in FIG. 1.

The apparatus 610 may include at least one processor 611, such as a data processor (DP) and at least one memory (MEM) 612 coupled to the processor 611. The apparatus 610 may further include a transmitter TX and receiver RX 613 coupled to the processor 611. The MEM 612 may be non-transitory machine/processor/computer readable storage medium and it may store a program (PROG) 614. The PROG 614 may include instructions that, when executed on the associated processor 611, enable the apparatus 610 to operate in accordance with the embodiments of the present disclosure, for example to perform the method 300. A combination of the at least one processor 611 and the at least one MEM 612 may form processing means 615 adapted to implement various embodiments of the present disclosure.

The apparatus 620 includes at least one processor 621, such as a DP, and at least one MEM 622 coupled to the processor 621. The apparatus 620 may further include a suitable TX/RX 623 coupled to the processor 621. The MEM 622 may be non-transitory machine/processor/computer readable storage medium and it may store a PROG

624. The PROG 624 may include instructions that, when executed on the associated processor 621, enable the apparatus 620 to operate in accordance with the embodiments of the present disclosure, for example to perform any of the methods 200-204. A combination of the at least one processor 621 and the at least one MEM 622 may form processing means 625 adapted to implement various embodiments of the present disclosure.

Various embodiments of the present disclosure may be implemented by computer program executable by one or more of the processors 611 and 621, software, firmware, hardware or in a combination thereof.

The MEMs 612 and 622 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 611 and 621 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a LTE or LTE-A wireless communication network, it should not be construed as limiting the spirit and scope of the present disclosure. The principle and concept of the present disclosure may be more generally applicable to other scenarios.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

Figure 7:
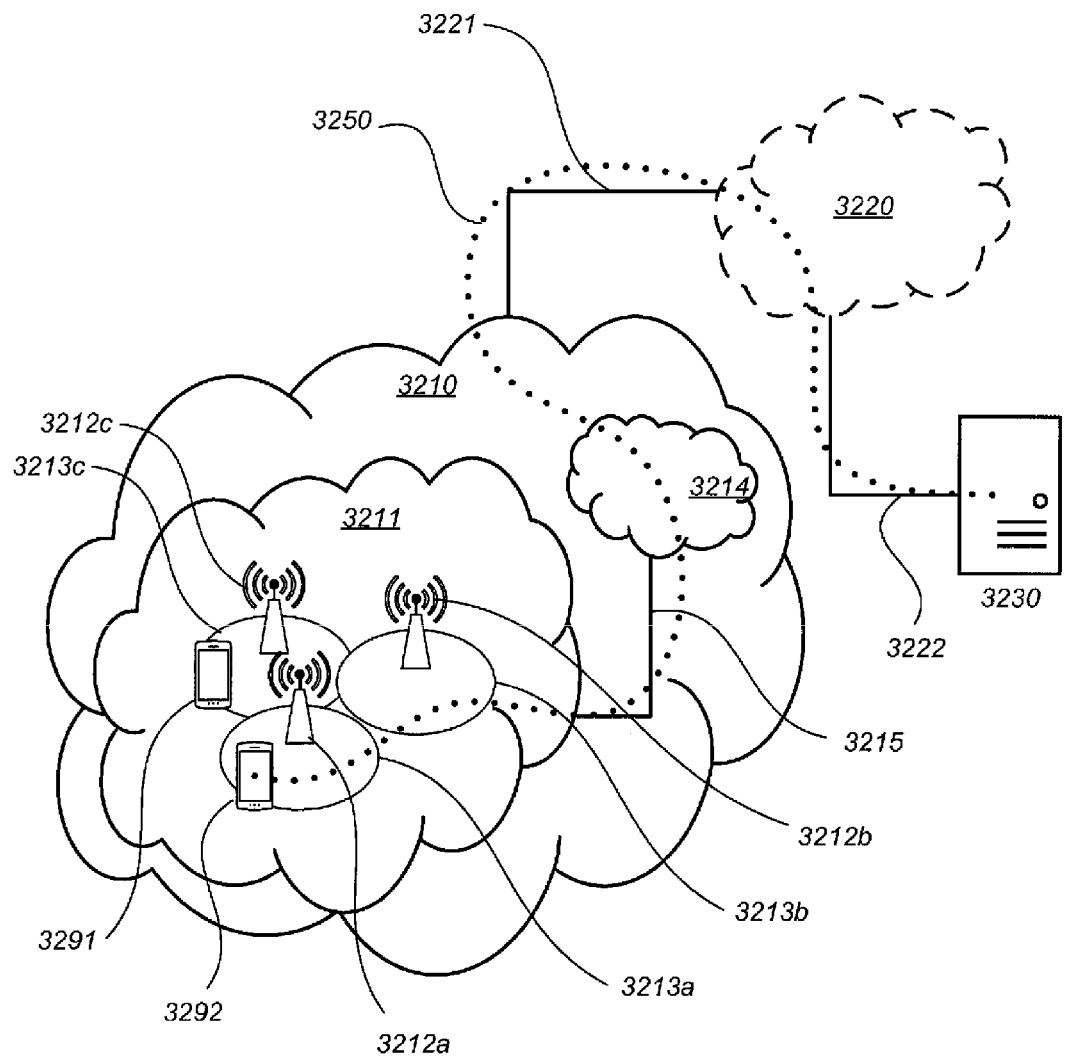
FIG. 7 schematically illustrates a telecommunication network connected via an intermediate network to a host computer.

Another aspect of the present disclosure provides a communication system, an example of which is illustrated in FIG. 7. With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
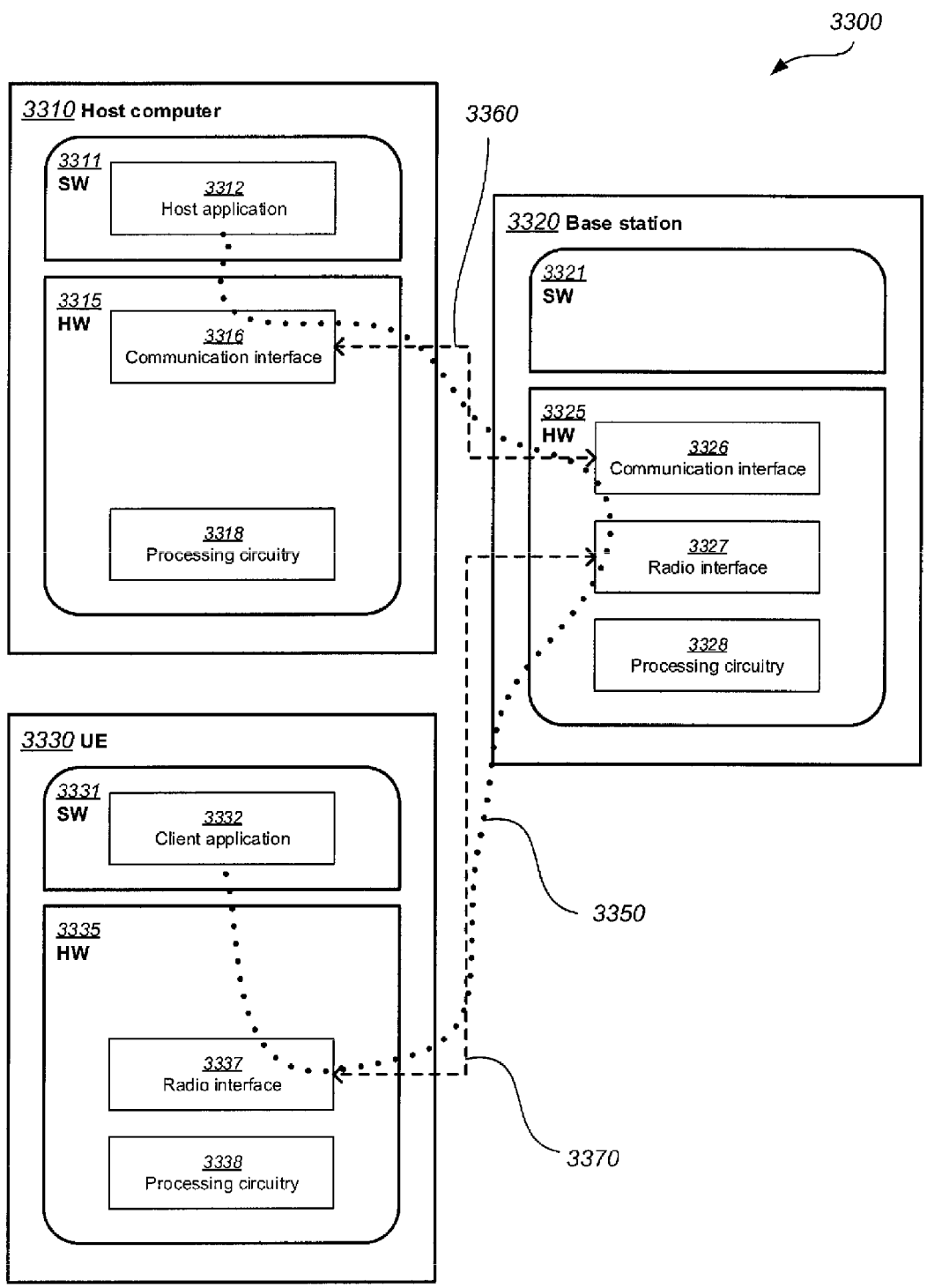
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212*a*, 3212*b*, 3212*c* and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. In an example, the use equipment 3330 may be one of the terminal devices 102-105 shown in FIG. 1 and the base station 3320 may be the network device 101 shown in FIG. 1. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the scheduling and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 9, 10:
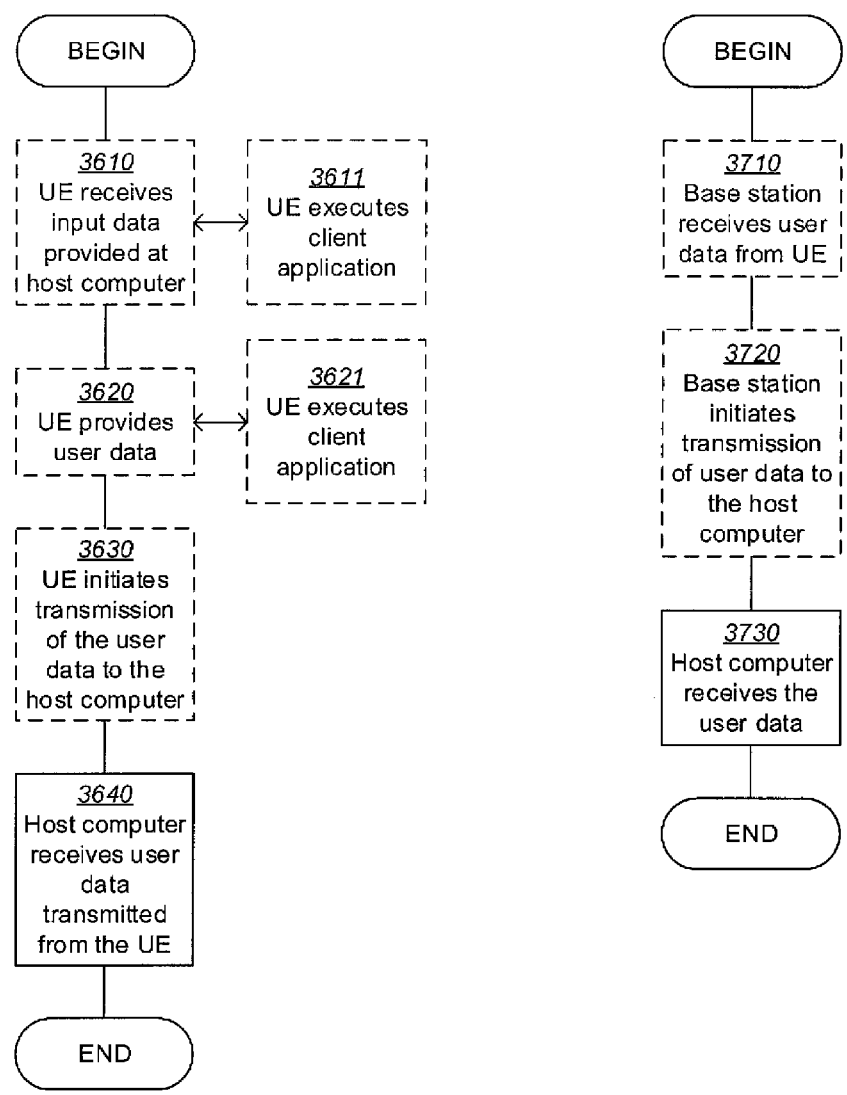
FIGS. 9 to 10 are flowcharts illustrating methods implemented in a communication system including a host computer, a base station and a user equipment.

FIGS. 9 to 10 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules or units), or combinations thereof. For a firmware or software, implementation may be made through modules or units (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some eases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

Some abbreviations used herein arc listed below:
3G Third Generation of Mobile Telecommunications Technology
BSR Buffer Status Report
CAM Cooperative Awareness Message
D2D Device-to-Device Communication
DENM Decentralized Environmental Notification Message
DSRC Dedicated Short-Range Communications
eNB eNodeB
ETSI European Telecommunications Standards Institute
LTE Long-Term Evolution
NW Network
RS Reference Signals
UE User Equipment
V2I Vehicle-to-Infrastructure
V2P Vehicle-to-Pedestrian
V2V Vehicle-to-vehicle communication
V2x Vehicle-to-anything-you-can-imagine
wrt with respect to
SPS Semi Persistent Scheduling
PDCCH Physical Downlink Control Channel
MAC Medium Access Control
MAC CE MAC Control Element
PUSCH Physical Uplink Shared Channel
PUCCH Physical Uplink Control Channel
PDU Packet Data Unit
3GPP Third Generation Partnership Project
LCID Logical Channel Identity
RRC Radio Resource Control
IP Internet Protocol
PPPP ProSe Per Packet Priority
ProSe Proximity Services
PRB Physical Resource Block
SL Sidelink
UL Uplink
DL Downlink
LCG Logical Channel Group
SFN System Frame Number
TTI Transmission Time Interval
SCI Sidelink Control Information

What is claimed is:

1. A method implemented at a terminal device, comprising:
   receiving, from a network device, a scheduling configuration for a device to device, D2D, transmission of the terminal device;
   receiving, from the network device, an uplink scheduling grant for a cellular uplink transmission in a same time resource overlapping with the D2D transmission;
   determining a scheduling priority for the D2D transmission relative to the cellular uplink transmission based on at least one of: a first comparison between an associated priority of the scheduling configuration and a first priority threshold, and a transmission restriction; and performing at least one of the D2D transmission and the cellular uplink transmission based on the determined scheduling priority, wherein the scheduling priority is determined further based on a second comparison between a priority of the cellular uplink transmission and a second priority threshold.

2. The method according to claim 1, wherein the scheduling configuration is a semi-persistent scheduling, SPS, configuration, and wherein the associated priority of the scheduling configuration is a priority specified in the SPS configuration.

3. The method according to claim 1, wherein the associated priority of the scheduling configuration is the highest or lowest priority of D2D packet data included in the D2D transmission scheduled by the scheduling configuration.

4. The method according to claim 1, wherein the associated priority of the scheduling configuration is indicated by a logical channel identity or a ProSe Per Packet Priority, PPPP, of a D2D packet in the D2D transmission.

5. The method according to claim 1, wherein the associated priority of the scheduling configuration indicates priority of a data logical channel included in the D2D transmission of a D2D Media Access Control Protocol Data Unit, MAC PDU.

6. The method according to claim 1, wherein said transmission restriction requires that the highest or lowest priority of D2D packet data included in the D2D transmission is higher than or equal to the first priority threshold, and wherein performing at least one of the D2D transmission and the cellular uplink transmission based on the determined scheduling priority includes:

transmitting a set of D2D packet data via the D2D transmission in the same time resource based on the scheduling configuration, at least one packet of the set of D2D packet data having a priority equal to or higher than the first priority threshold.

7. The method according to claim 6, wherein said transmission restriction requires that the value of the highest or lowest priority of D2D packet data included in the D2D transmission is lower than or equal to the value of the first priority threshold.

8. The method according to claim 1, wherein said transmission restriction requires that the highest priority of D2D packet data included in the D2D transmission is lower than the first priority threshold, and wherein performing at least one of the D2D transmission and the cellular uplink transmission based on the determined scheduling priority comprises:

performing the cellular uplink transmission in the same time resource based on the uplink scheduling grant.

9. The method according to claim 8, wherein said transmission restriction requires that the value of the highest priority of D2D packet data included in the D2D transmission is higher than the value of the first priority threshold.

10. The method according to claim 1, wherein said determining a scheduling priority for the D2D transmission relative to a cellular uplink transmission comprises:

determining a first scheduling priority for a first set of D2D packet data with a priority equal to or higher than the first priority threshold, a second scheduling priority lower than the first scheduling priority for the uplink cellular transmission, and a third scheduling priority lower than the second priority for a second set of D2D packet data with a priority lower than the first priority threshold; and wherein performing at least one of the D2D transmission and the cellular uplink transmission based on the determined scheduling priority includes:

allocating at least one of resources and transmission power for the first set of D2D packet data, the uplink cellular transmission, and the second set of D2D packet data, in a descending scheduling priority order until at least one of available resource and transmission power budget of the terminal device is exhausted; and performing transmission according to the allocated at least one of resources and transmission power.

11. The method according to claim 1, further comprising: receiving the first priority threshold from the network device.

12. The method according to claim 1, further comprising: receiving the second priority threshold from the network device.

13. The method according to claim 1, further comprising: receiving, from the network device, a set of priority values for cellular uplink packets to be prioritized over the D2D transmission; and wherein the scheduling priority is determined further based on the set of priority values.

14. The method according to claim 1, further comprising: requesting, from the network device, a resource for transmitting, via cellular uplink, one of:

D2D packet data with a priority lower than the first priority threshold, and

D2D packet data with a priority higher than the first priority threshold.

15. The method according to claim 1, further comprising: reporting, to the network device, a collision between a cellular uplink transmission and a D2D transmission by the terminal device.

16. The method according to claim 15, wherein said reporting includes:

reporting the collision between the cellular uplink transmission and the D2D transmission by the terminal device in response to a predefined triggering condition being satisfied.

17. A method implemented at a network device, comprising:

determining a scheduling priority for a device to device, D2D, transmission of a terminal device based on at least one of: a first comparison between an associated priority of a scheduling configuration for the D2D transmission, a first priority threshold, and a transmission restriction; and determining, based on the scheduling priority, whether to schedule a cellular uplink transmission for the terminal device in a same time resource overlapping with the D2D transmission, wherein the scheduling priority is determined further based on a second comparison between a priority of the cellular uplink transmission and a second priority threshold.

18. The method according to claim 17, wherein said transmission restriction requires that the highest or lowest priority of D2D packet data included in the D2D transmission is higher than or equal to the first priority threshold, or, requires that the highest priority of D2D packet data included in the D2D transmission is lower than the first priority threshold.

19. The method according to claim 18, wherein said transmission restriction requires that the value of the highest or lowest priority of D2D packet data included in the D2D transmission is lower than or equal to the value of the first priority threshold, or, requires that the value of the highest priority of D2D packet data included in the D2D transmission is higher than the value of the first priority threshold.

20. The method according to claim 17, wherein the scheduling configuration is a semi-persistent scheduling, SPS, configuration, and
   wherein the associated priority of the scheduling configuration is a priority specified in the SPS configuration.

21. The method according to claim 17, wherein the associated priority of the scheduling configuration is the highest or lowest priority of D2D packet data to be included in the D2D transmission scheduled by the scheduling configuration.

22. The method according to claim 17, wherein the associated priority of the scheduling configuration is indicated by a logical channel identity or a ProSe Per Packet Priority, PPPP, of a D2D packet in the D2D transmission.

23. The method according to claim 17, further comprising:
   indicating, to the terminal device, a set of priority values for uplink packets to be prioritized over the D2D transmission.

24. An apparatus implemented at a terminal device, the apparatus comprising a processor and a memory, said memory containing instructions executable by said processor whereby said apparatus is operative to:
   receive, from a network device, a scheduling configuration for a device to device, D2D, transmission of the terminal device;
   receive, from the network device, an uplink scheduling grant for a cellular uplink transmission in a same time resource overlapping with the D2D transmission;
   determine a scheduling priority for the D2D transmission relative to the cellular uplink transmission based on at least one of: a first comparison between an associated priority of the scheduling configuration and a first priority threshold, and a transmission restriction; and
   perform at least one of the D2D transmission and the cellular uplink transmission based on the determined scheduling priority,
   wherein the scheduling priority is determined further based on a second comparison between a priority of the cellular uplink transmission and a second priority threshold.

25. An apparatus implemented at a network device, the apparatus comprising a processor and a memory, said memory containing instructions executable by said processor whereby said apparatus is operative to:
   determine a scheduling priority for the D2D transmission based on at least one of: a first comparison between an associated priority of the scheduling configuration and a first priority threshold, and a transmission restriction; and
   determine, based on the scheduling priority, whether to schedule a cellular uplink transmission for the terminal device in a same time resource overlapping with the D2D transmission,
   wherein the scheduling priority is determined further based on a second comparison between a priority of the cellular uplink transmission and a second priority threshold.

* * * * *